(12) United States Patent
Holz

(10) Patent No.: US 10,222,215 B2
(45) Date of Patent: Mar. 5, 2019

(54) METHODS AND SYSTEMS FOR MAP GENERATION AND ALIGNMENT

(71) Applicant: X Development LLC, Mountain View, CA (US)

(72) Inventor: Dirk Holz, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/494,341

(22) Filed: Apr. 21, 2017

(65) Prior Publication Data
US 2018/0306587 A1    Oct. 25, 2018

(51) Int. Cl.
| | | |
|---|---|---|
| *G06K 9/00* | (2006.01) | |
| *G01C 21/20* | (2006.01) | |
| *G06T 7/33* | (2017.01) | |
| *G06T 7/73* | (2017.01) | |
| *G01S 5/16* | (2006.01) | |

(52) U.S. Cl.
CPC .............. *G01C 21/206* (2013.01); *G01S 5/16* (2013.01); *G06T 7/344* (2017.01); *G06T 7/74* (2017.01); *G06T 2207/30204* (2013.01); *G06T 2207/30244* (2013.01); *G06T 2207/30252* (2013.01)

(58) Field of Classification Search
CPC ......... G01C 21/206; G06T 7/74; G06T 7/344; G06T 2207/30204; G06T 2207/30244; G06T 2207/30252; G01S 5/16
See application file for complete search history.

(56) References Cited

U.S. PATENT DOCUMENTS

| | | | | |
|---|---|---|---|---|
| 9,354,070 B2* | 5/2016 | Thomson | ................ | B66F 9/063 |
| 9,816,820 B2* | 11/2017 | Willis | .................. | G01C 21/165 |
| 2012/0303255 A1* | 11/2012 | Wong | .................. | G05D 1/0274 |
| | | | | 701/300 |
| 2012/0310468 A1* | 12/2012 | Wong | ..................... | G01C 21/00 |
| | | | | 701/29.9 |

(Continued)

OTHER PUBLICATIONS

Wurm, K.M. et. al, "Bridging the gap between feature- and grid-based SLAM," Robotics and Autonomous Systems, Elservier Science Publishers, Amsterdam, NL, vol. 58, No. 2, dated Sep. 22, 2009, pp. 140-148.

(Continued)

*Primary Examiner* — Shefali D Goradia
(74) *Attorney, Agent, or Firm* — McDonnell Boehnen Hulbert & Berghoff LLP

(57) ABSTRACT

Example implementations relate to map generation and alignment. For instance, a computing system may receive and use sensor data indicative of positions of multiple markers positioned relative to a sensor within an environment to determine a pose of the sensor and also create a map that indicates the markers positions. The computing system may also receive and use subsequent sensor data indicative of distances from the sensor to surfaces in the environment and the determined pose of the sensor to determine an occupancy grid map that represents the surfaces within the environment. The computing system may then determine a transformation between the map of the markers and a design model of the environment that relates occupied cells in the occupancy grid map to sampled points from the design model, and provide the transformation between the map of the plurality of markers and the design model.

19 Claims, 15 Drawing Sheets

(56) References Cited

U.S. PATENT DOCUMENTS

2014/0350839 A1 11/2014 Pack
2016/0271795 A1* 9/2016 Vicenti .................... B25J 9/163
2017/0329332 A1* 11/2017 Pilarski ............... B60W 30/143

OTHER PUBLICATIONS

Kakuma, Daisuke et al., "Alignment of Occupancy Grid and Floor Maps Using Graph Matching," 2017 IEEE 11th International Conference on Semantic Computing (ICSC), Jan. 30, 2017, pp. 57-60.
International Search Report issued in co-pending International Patent Application No. PCT/US2018/022385, European Patent Office, dated Jul. 3, 2018, 7 pages.
Written Opinion issued in co-pending International Patent Application No. PCT/US2018/022385, European Patent Office, dated Jul. 3, 2018, 10 pages.

* cited by examiner

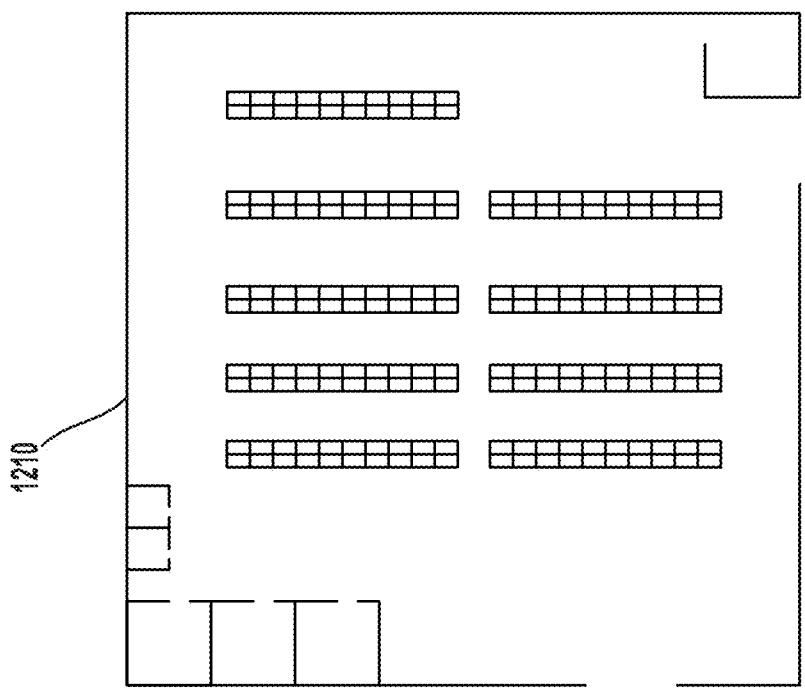
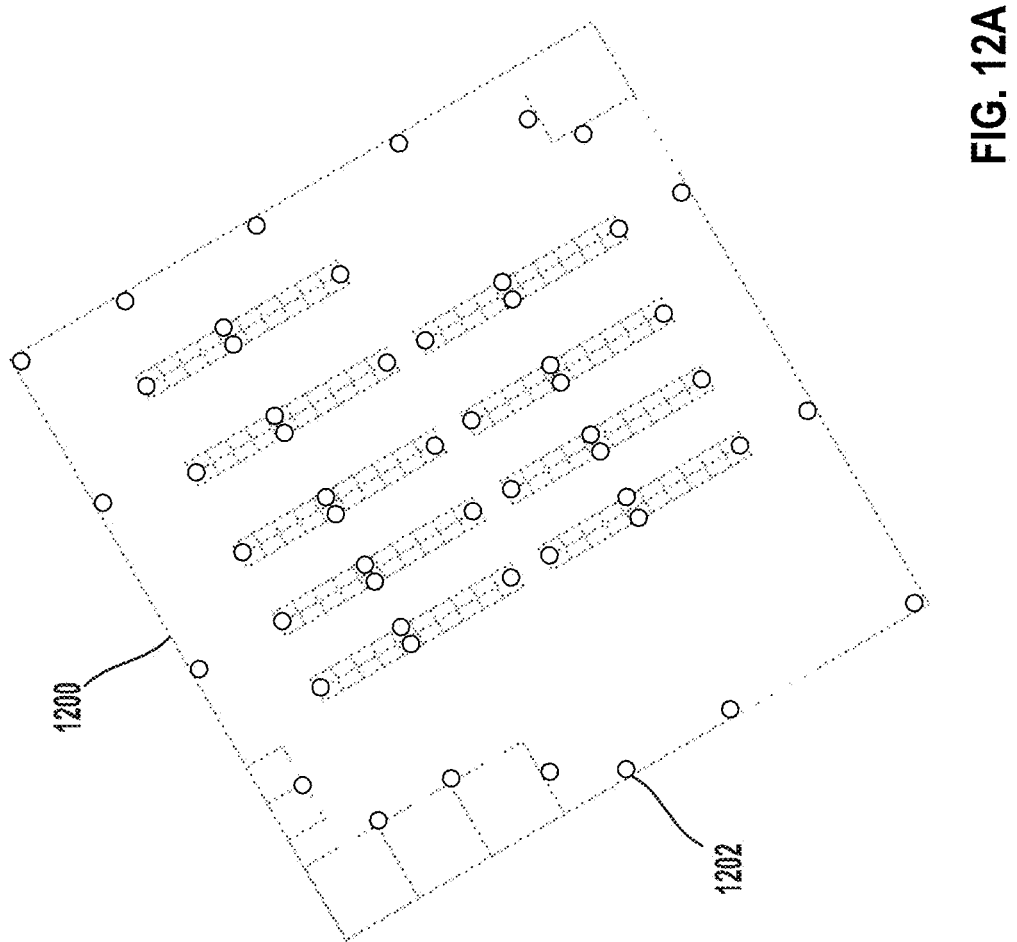
FIG. 12A

1400

METHODS AND SYSTEMS FOR MAP GENERATION AND ALIGNMENT

BACKGROUND

Commercial entities, such as manufacturers, wholesalers, and transport businesses, often use warehouses to store items, such as raw materials, parts or components, packing materials, and finished products. A warehouse can enable the organization of items through use of pallets and pallet racks to store numerous pallets holding various items in a manner that permits for easier access and efficient processing. As such, a warehouse may use various types of pallets, which are flat transport structures configured to hold items for transportation by vehicles and other equipment operating in the warehouse.

Traditionally, human operators may operate machines, vehicles, and other equipment within the warehouse. For instance, a human operator may navigate a forklift to lift and transport pallets between a delivery area and storage. However, with continuous advancements in sensors, computing power, and other technologies, companies are switching to autonomous and semi-autonomous vehicles for performing operations within warehouses rather than relying on human operators.

SUMMARY

Example implementations relate to methods and systems for map generation and alignment. An example implementation may involve a computing system using measurements of markers placed within an environment from a sensor to build a map of the marker positions. The computing system may further use distance measurements to surfaces in the environment to align the map of the markers with a design model of the environment.

In one aspect, an example method is provided. The method may include receiving, from a sensor, first sensor data indicative of positions of a plurality of markers relative to the sensor within an environment, and determining a pose of the sensor within a map of the plurality of markers based on the first sensor data. The method may further include receiving, from the sensor, second sensor data indicative of distance from the sensor to a surface within the environment, and determining an occupancy grid map representing the surface within the environment based on the second sensor data and the determined pose of the sensor. The method may also include determining a transformation between the map of the plurality of markers and a design model of the environment that relates occupied cells in the occupancy grid map to sampled points from the design model, and providing the transformation between the map of the plurality of markers and the design model.

In another aspect, an example system is provided. The system may include a sensor, a computing system, a non-transitory computer readable medium, and program instructions stored on the non-transitory computer readable medium and executable by the computing system to receive, from the sensor, first sensor data indicative of positions of a plurality of markers relative to the sensor within an environment and determine a pose of the sensor within a map of the plurality of markers based on the first sensor data. The program instructions stored on the non-transitory computer readable medium may further cause the computing system to receive, from the sensor on the sensor, second sensor data indicative of distance from the sensor to a surface within the environment, and determine an occupancy grid map representing the surface within the environment based on the second sensor data and the determined pose of the sensor. The program instructions stored on the non-transitory computer readable medium may further cause the computing system to determine a transformation between the map of the plurality of markers and a design model of the environment that relates occupied cells in the occupancy grid map to sampled points from the design model, and provide the transformation between the map of the plurality of markers and the design model.

In a further aspect, a non-transitory computer readable medium is provided. The non-transitory computer readable medium has stored therein instructions executable by a computing system to cause the computing system to perform operations. The operations may include receiving, from a sensor, first sensor data indicative of positions of a plurality of markers relative to the sensor within an environment, and determining a pose of the sensor within a map of the plurality of markers based on the first sensor data. The operations may further include receiving, from the sensor, second sensor data indicative of distance from the sensor to a surface within the environment, and determining an occupancy grid map representing the surface within the environment based on the second sensor data and the determined pose of the sensor. The operations may also include determining a transformation between the map of the plurality of markers and a design model of the environment that relates occupied cells in the occupancy grid map to sampled points from the design model, and providing the transformation between the map of the plurality of markers and the design model.

In yet another aspect, a system is provided. The system may include means for map generation and alignment. In particular, the system may include means for receiving, from a sensor, first sensor data indicative of positions of a plurality of markers relative to the sensor within an environment, and means for determining a pose of the sensor within a map of the plurality of markers based on the first sensor data. The system may further include means for receiving, from the sensor, second sensor data indicative of distance from the sensor to a surface within the environment, and means for determining an occupancy grid map representing the surface within the environment based on the second sensor data and the determined pose of the sensor. The system may also include means for determining a transformation between the map of the plurality of markers and a design model of the environment that relates occupied cells in the occupancy grid map to sampled points from the design model, and means for providing the transformation between the map of the plurality of markers and the design model.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 12A illustrates a transformation determination between a map of marker positions and a design model, in accordance with example embodiments.

DETAILED DESCRIPTION

Figure 1:
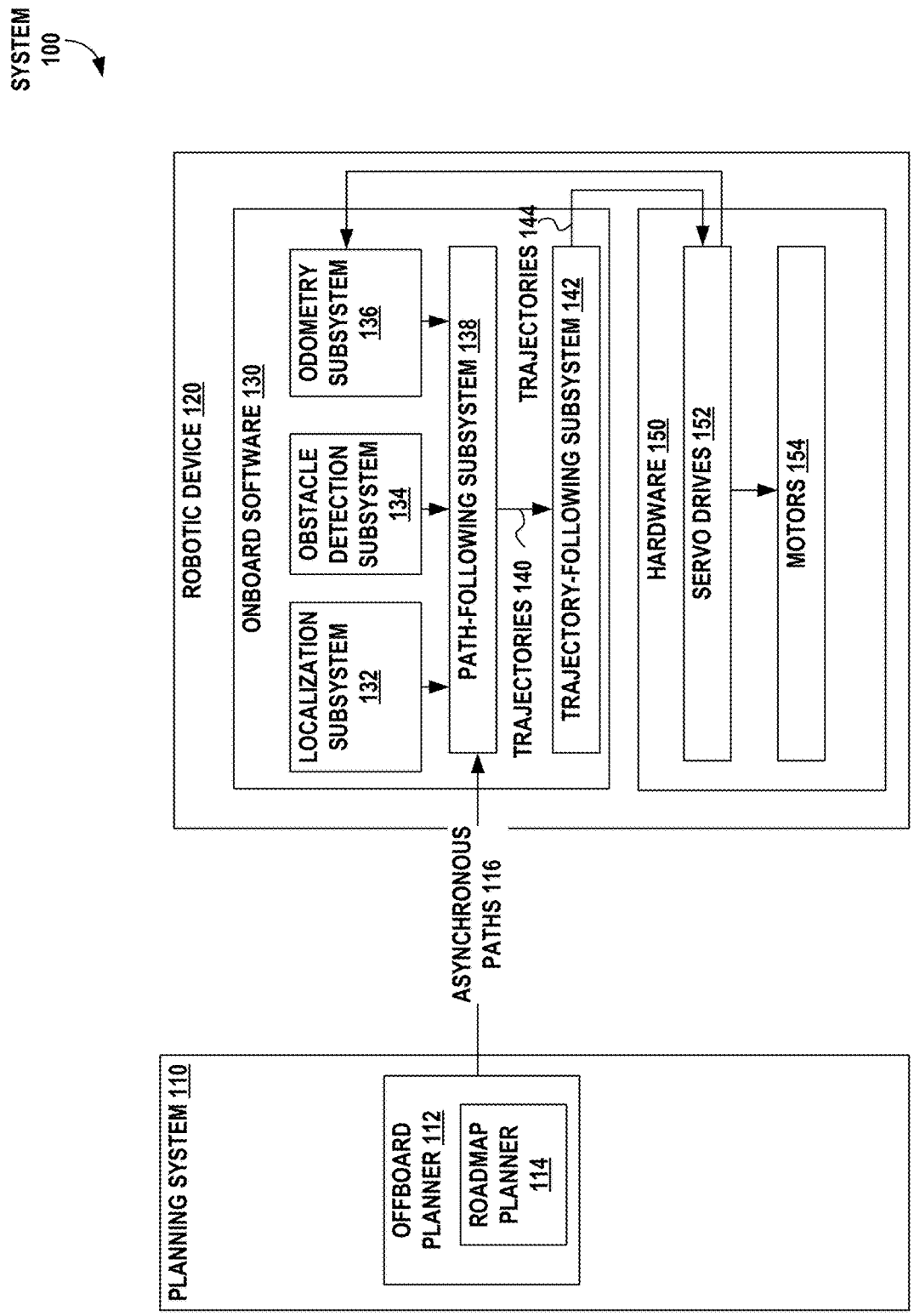
FIG. 1 is a block diagram of a system, in accordance with an example embodiment.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features.

The example implementations described herein are not meant to be limiting. It will be readily understood that aspects of the present disclosure, as generally described herein, and illustrated in the figures, can be arranged, substituted, combined, separated, and designed in a wide variety of different configurations, all of which are explicitly contemplated herein.

I. Overview

Advancements in computing and sensor capabilities have helped contribute to an increase in the deployment of robotic devices (robots) to perform operations within warehouses and other types of environments. Although some operations can be performed by stationary robots, many tasks often require a robot to successfully navigate between multiple positions. Therefore, in order to complete tasks, a mobile robot may require a substantial understanding of the environment.

In practice, various methods may be used to develop information for a mobile robot to use to navigate an environment effectively. Particularly, a mobile robot may rely upon one or more maps of the space that can enable its control system to determine proper navigation strategies around physical boundaries.

To develop a map of an environment, an example method may involve manually surveying the environment to determine the positions of various landmarks that a robot may use during navigation. Landmarks represent detectable features in the environment that can be used for position and orientation reference. For example, a warehouse may include retroreflective markers (markers) or other infrastructure positioned at particular locations to help guide robots. Markers and other possible landmarks are useful since they can be re-observed from different positions and different angles as a robot changes position. For illustration purposes, markers will be used as the primary landmarks discussed herein, but other types of landmarks are also possible within examples.

Although a manual survey of an environment may enable the creation of an accurate map of the markers that a robot can use, this process is time consuming and can delay the deployment of robots. Further, the method may not produce a map of marker positions aligned with a design model that specifies physical features of the space. The method may also require subsequent tests to identify particular areas that prove difficult to navigate without adding more markers.

In order to speed up the mapping process and enable real-time user feedback, a computing system may perform a simultaneous localization and mapping (SLAM) process to build a map of an unknown environment (e.g., a warehouse) using measurements provided by a sensor while the sensor provides measurements from different positions within the environment. SLAM may involve marker detection, data association, pose estimation, and pose/marker refinement, and can be performed in either two-dimensions (2D) or three-dimensions (3D) using a variety of sensor data, such as laser scans of the environment. While performing SLAM, the computing system may develop a map that specifies positions of detected markers that can be used by robots and other vehicles (autonomous or manual) deployed in the environment.

In some example embodiments, the computing system may simultaneously perform SLAM while also determining a transformation that aligns a partially completed map of marker positions with a design model of the environment, such as a computer-aided design (CAD) model that specifies structure and locations of physical features (e.g., walls, stairs, charging stations, and parking spots). The transformation may align the map of markers with the design model such that a robot control system may accurately use the position of markers and physical features together during navigation. The computing system may provide the transformation, the design model, and the map of markers to control systems of robots deployed in the environment to enable safe navigation. In some instances, a human operator may use the combined information when navigating a vehicle within the environment.

In an example embodiment, a computing system may use distance measurements from a sensor to align detected positions of markers with the walls and other infrastructure in a CAD model of the environment. For instance, the computing system may determine that a first marker is positioned nearby stairs and another marker is positioned on a wall relative to a door based on distance measurements provided by the sensor.

In some examples, a computing system may generate an occupancy grid map that includes a number of cells that represent corresponding areas in the environment based on incoming sensor measurements of surrounding surfaces. In particular, the computing system may develop the occupancy grid map with a coordinate frame that corresponds to the point-of-view (POV) of the sensor. Each cell of the occupancy grid map may have an assigned state that indicates a status of the represented area. For instance, a cell may include an obstacle, free space, or unknown. Since the occupancy grid map may be developed using sensor measurements from the POV of the sensor, the occupancy grid map may be determined using the same coordinate frame as the map of markers developed based on sensor measurements. As a result, the computing system may align the map of markers with a CAD model by minimizing errors between the occupancy grid map and the CAD model.

To minimize errors between a developed occupancy grid map and a CAD model representative of the environment, a transformation that relates occupied cells in the occupancy grid map to sampled points from the design model may be used. For instance, the transformation may involve a rotation and a translation of a horizontal plane that reduces errors between cells or points of the occupancy grid map and sampled points from the design model. In some examples, a computing system may sample various 2D rotation and translation values when determining the transformation.

In further examples, a computing system may simultaneously develop a map of marker positions within the environment while also determining a transformation that aligns the map of markers to a design model. For instance, the computing system may build a transformation optimization into a graph-based SLAM implementation that enables a single run through an environment to align a map of marker positions within the environment with the design model. In effect, a computing system may use the above process to enable robots to leverage an existing CAD model of an environment after a single iteration of SLAM.

In some examples, a computing system may alternate between performing operations of SLAM (or a similar process) and updating a transformation that aligns a developed map of marker positions to a design model. For instance, a computing system may determine a pose of a sensor relative to a map of detected markers and subsequently use measurements of nearby surfaces in the environment to align the map of marker positions to a CAD model. As a result, a robot as well as other vehicles may navigate the environment using information indicative of both the positions of markers and physical features. For example, a control system may use the positions of markers to determine a strategy to navigate around physical walls to a parking spot or storage rack as indicated in the design model of the environment.

In some examples, a computing system may align a map of markers with a CAD model by setting the coordinate frame of the map of markers in relation with the coordinate frame of the CAD model. As such, the computing system may be configured to automatically align new additions to the map of markers via transform to the walls, racking, and other structures set forth in a CAD model. In addition, the computing system may use additional sensor data to refine the pose of the sensor within the map of marker positions. The computing system may also use the refined pose to adjust the transformation that aligns the map of marker positions with the design model. For example, the computing system may adjust the transformation by sampling a narrower range of candidate transformations that are based on the original transformation.

In some example embodiments, a computing system may provide a determined transformation to other systems (e.g., control systems of robots deployed in the environment). Control systems of robots may use the marker map, the transformation, and/or the design model to navigate the environment. In some cases, the computing system may provide control instructions based on the transformation and the design model of the environment (e.g., CAD model) to the robot's control system.

II. System Design for Robotic Devices

FIG. 1 is a block diagram of system 100, in accordance with an example embodiment. System 100 includes planning system 110 and robotic device 120. Planning system 110 can include offboard planner 112 that can coordinate motions of one or more robotic devices operating in an environment. Offboard planner 112 may include roadmap planner 114 such that offboard planner 112 and/or roadmap planner 114 may generate one or more asynchronous paths 116 for a robotic device (e.g., robotic device 120) to follow in an environment.

A roadmap graph, prototype graph, or other roadmap representative of an environment, such as prototype graph 300 discussed below in the context of FIG. 3, can be received, determined, or otherwise provided to planning system 110, offboard planner 112 and/or roadmap planner 114. Asynchronous paths 116 can be one or more paths developed based on one or more of the roadmap graph, prototype graph, or other roadmap. For example, if the roadmap graph, prototype graph, or other roadmap has a plurality of edges that connect a plurality of intersections, asynchronous paths 116 can be specified in terms of the plurality of edges and/or the plurality of intersections.

In some examples, robotic device 120 can be any one or more steered vehicle(s) capable of following a path. For example, robotic device 120 can include onboard software 130 and/or hardware 150. Onboard software 130 can include one or more of: localization subsystem 132, obstacle detection subsystem 134, odometry subsystem 136, path-following subsystem 138, and trajectory-following subsystem 142. As such, onboard software 130 may include additional software systems in other examples.

Localization subsystem 132 represents a system capable of localizing a robotic device. In other words, localization subsystem 132 may enable location determination of the robotic device with respect to an environment. For instance, localization subsystem 132 can generate position estimates of the robotic device and/or other objects that can be used to localize the robotic device and assist the robotic device in following a desired path (e.g., asynchronous paths 116), and/or assist the robotic device in following a trajectory (e.g., trajectories 140). Once the position estimates are generated, localization subsystem 132 can provide the position estimates to path-following subsystem 138.

An asynchronous path, or path for short, can be a time-invariant plan or other information indicating how robotic device 120 may travel from a starting point (SP) to an ending point (EP); i.e., an (asynchronous) path does not take time into account. In contrast, a trajectory can include values of a steering angle and of traction motor velocity that robotic device 120 can follow for a planning time interval.

The planning time interval can be a duration of time during which a robotic device is guided, or planned, to follow a path, route, and/or travel. In some embodiments, the planning time interval can be a predetermined amount of time; e.g., five seconds, one second, 0.2 seconds, 0.1 seconds. In particular, a predetermined planning time interval can be determined based on a user input that specifies a value for the planning time interval. In other embodiments, the planning time interval can be determined based on one or more other values; e.g., a stitch time, a time associated with a uniform edge (or path) cost, an estimated time to travel along a trajectory. Other techniques for determining the planning time interval and values for the planning time interval are possible as well.

Then, one or more trajectories can be used to describe how robotic device 120 can travel from starting point (SP) to an ending point (EP) in a time-variant manner. In some embodiments, a trajectory can also provide information about values of other variables than a steering angle and a traction motor velocity over the planning time interval, such as, but not limited to, other kinematic variables (e.g., velocity and acceleration) of robotic device 120, and actuator positions of robotic device 120.

As an example, a path to drive a car from a location "home" to a location "work" may include an ordered listing of streets that a control entity, such as a person or control device of an autonomous vehicle, can use to drive the car from home to work. In this example, a trajectory from home to work can involve one or more instructions specifying velocity and/or acceleration that the control entity can use to drive the car from home to work. In some examples, the trajectory can take traffic, obstacles, weather, and other time-sensitive conditions into account; e.g., the trajectory to go from home to work can indicate that the control entity "turn right for 10 seconds at 20 MPH or less", "accelerate to 55 MPH and drive straight for 3 minutes", "slow to 20 MPH within 30 seconds", "turn left for 10 seconds at 20 MPH or less", etc. In some embodiments, the trajectory can be changed along the way; e.g., to account for obstacles, changes in path, etc.

Obstacle detection subsystem 134 can determine whether one or more obstacles are blocking a path and/or a trajectory of robotic device 120. Examples of these obstacles can include, but are not limited to, pallets, objects that may have fallen off a pallet, robotic devices, and human operators working in the environment. If an obstacle is detected, obstacle detection subsystem 134 can provide one or more communications indicating obstacle detection to path-following subsystem 138. The one or more communications indicating obstacle detection can include location information about one or more positions of one or more obstacles detected by obstacle detection subsystem 134 and/or identification information about the one or more obstacles detected by obstacle detection subsystem 134. Odometry subsystem 136 can use data, such as data from servo drives 152, to estimate one or more changes in position of robotic device 120 over time.

Path-following subsystem 138 and/or trajectory-following subsystem 142 can act as a planner aboard robotic device 120. This onboard planner can follow one or more paths, such as asynchronous paths 116, based on position estimates provided by localization subsystem 132.

Path-following subsystem 138 can receive asynchronous paths 116, position estimate inputs from localization subsystem 132, location information about one or more positions of one or more obstacles from obstacle detection subsystem 134, and/or information about one or more changes in position from odometry subsystem 136, and generate one or more trajectories 140 as outputs.

Hardware 150 can include servo drives 152 and/or motors 154. Servo drives 152 can include one or more servomechanisms and related electrical equipment. In some examples, servo drives 152 can include one or more electronic amplifiers used to power the one or more servomechanisms and/or to monitor feedback signals from the servomechanism(s). Servo drives 152 can receive control signals, such as trajectories 144, from onboard software 130, and can provide electric current to the servomechanism(s) to produce motion proportional to the control signals. In some embodiments, servo drives 152 can compare status information received from the servomechanism(s) with an expected status as commanded by trajectories 144. Then, servo drives 152 can adjust a voltage frequency or pulse width of the provided electric current to correct for deviations between received status information and an expected status. In other embodiments, servo drives 152 can provide information, such as the feedback signals and/or location-related information, to onboard software 130.

One or more motors 154 can be part or all of the servomechanism(s) of servo drives 152. For example, motors 154 can use the electric current provided by servo drives 152 to generate mechanical force to drive part or all of robotic device 120; e.g., motors 154 can provide force to propel robotic device 120 and/or drive one or more effectors of robotic device 120.

Path planning of robotic devices within an environment, such as an environment that includes indoor settings, such as a warehouse, office building, or home, and/or outdoor settings, such as a park, parking lot, or yard, can be performed with respect to a roadmap graph, which is a connected graph of paths that agents, such as robotic devices, may follow. Using roadmap graphs to plan agent routing within the environment rather than taking a free-space approach can reduce a total planning state space and so making large-scale multi agent coordination tractable. Further, the use of roadmap graphs can enable operators to intuitively control areas in which robotic devices are allowed to navigate.

Roadmap graph generation can first involve generation of a prototype graph, which indicates the rough position of lanes and directions of travel. In some examples, a prototype graph can be a directed graph that indicates lanes and directions of travel of robotic devices. In other examples, a prototype graph can be generated manually based on a map or drawing of the environment.

Figure 2:
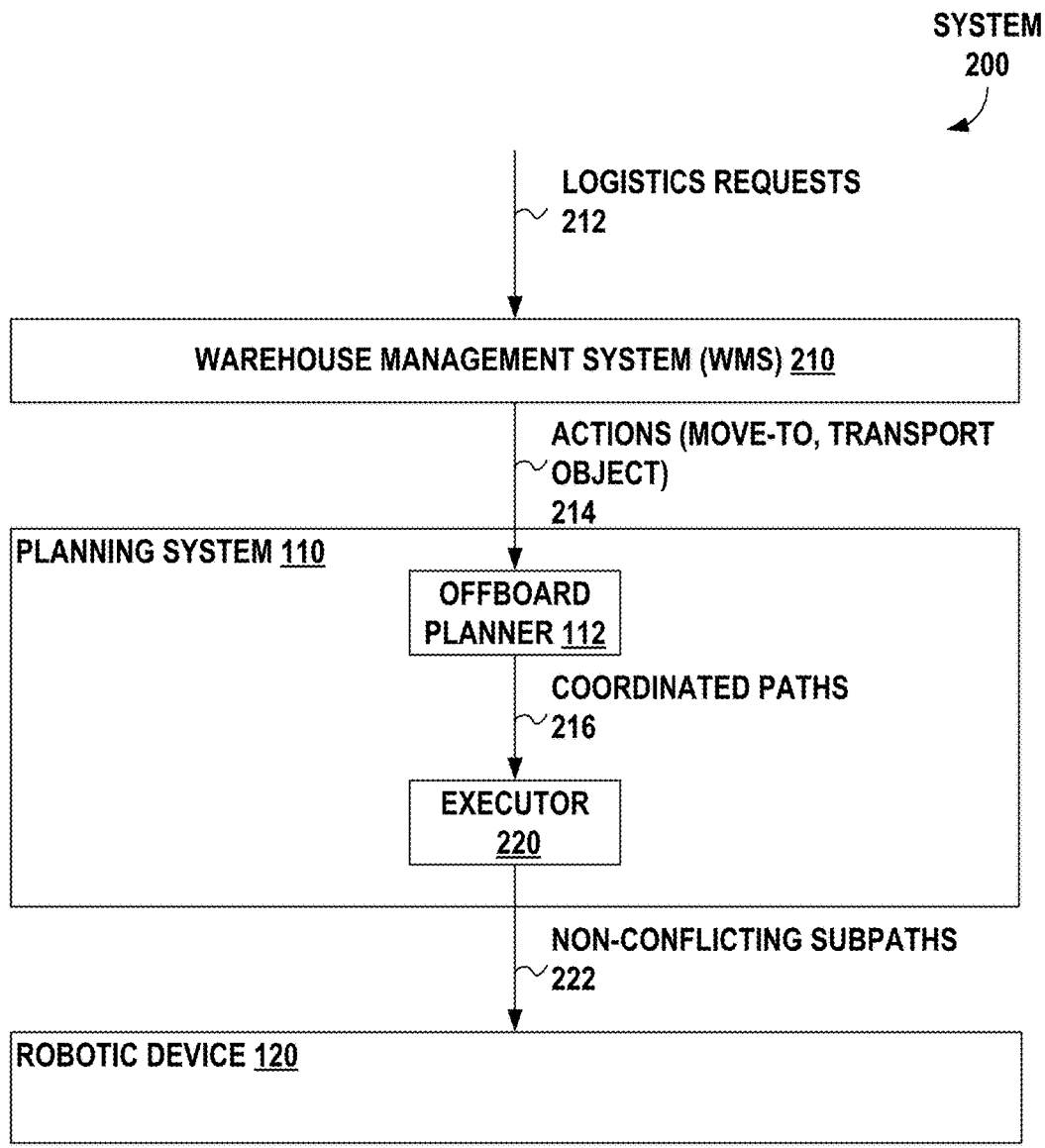
FIG. 2 depicts a system for operating one or more warehouses, in accordance with an example embodiment.

FIG. 2 depicts system 200 for operating one or more warehouses, in accordance with an example embodiment. System 200 includes warehouse management system 210, planning system 110, and robotic device 220. Warehouse management system 210 can receive one or more logistics requests 212 associated with the warehouse; e.g., requests to store one or more items in the warehouse and/or requests to ship one or more items from the warehouse. Warehouse management system 210 can translate logistics requests 212 into one or more actions 214, where actions 214 can include, but are not limited to, a "move-to" action to move one or more designated agents to one or more designated locations, and a "transport" action to carry one or more items to one or more designated locations. In some examples, actions 214 can include go-to commands of the form {agent ID, destination}, but other actions are possible such as "move pallet". These are typically decomposable into move-to commands, however (move to pick location, move to place location).

Planning system 110 includes offboard planner 112 and executor 220. Offboard planner 112 can receive actions 214 as inputs and generate one or more coordinated paths 216 for one or more agents operating in a warehouse; e.g., multiple robotic devices, to carry out actions 214. Coordinated paths 216 can be part of a coordinated action plan for all agents in the warehouse to fulfill logistics requests 212. The coordinated action plan can take precedence of agents into account; e.g., if robotic devices RD1 and RD2 are both expected to reach a point at approximately the same time, one of the robotic devices can have precedence or priority over the other, such as robotic device RD1 waiting for robotic device RD2 to pass through the point (or vice versa). Executor 220 can receive coordinated paths 216 and generate non-conflicting sub-paths 222 to direct robotic device 120 in accomplishing its part of the coordinated action plan to carry out actions 214 to fulfill logistics requests 212.

As illustrated above in FIG. 2, planning system 110, which includes offboard planner 112 and executor 220, can communicate with robotic device 120. In some embodiments, the robotic device can be a fork truck; for example, any Occupational Safety and Health Administration (OSHA) Class 1 or Class 3 powered industrial truck. In other embodiments, planning system 110 can includes software that executes using one or more networked computing devices located in the "cloud" (e.g., one or more networked computing devices) and/or located somewhere on a premises co-located with robotic device 120.

Figure 3:
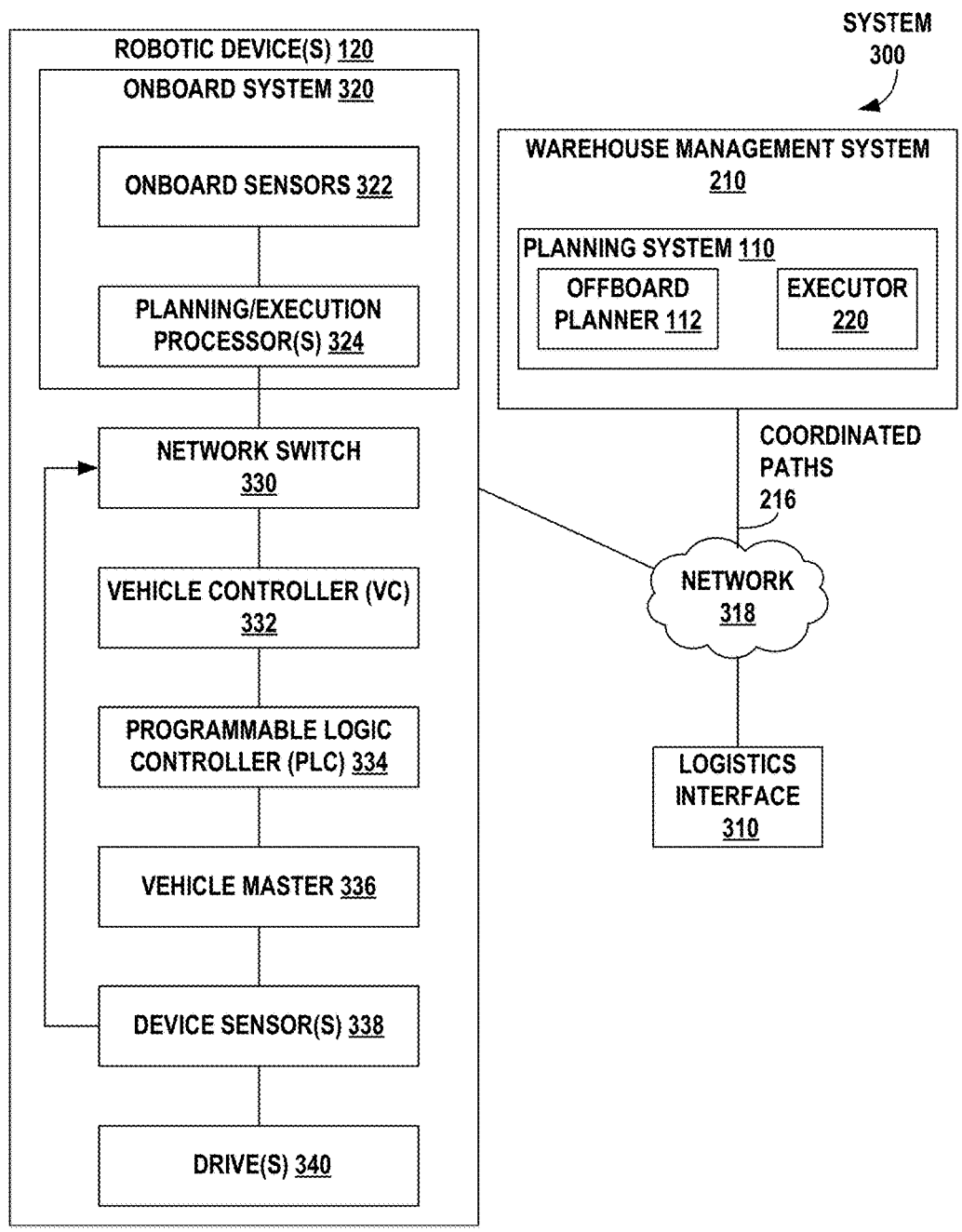
FIG. 3 illustrates a system, in accordance with an example embodiment.

FIG. 3 illustrates a system 300 that includes logistics interface 310, warehouse management system 210, and one or more robotic devices 120 connected using network 318, in accordance with an example embodiment. Logistics interface 310 can provide inventory task instructions to warehouse management system 210 via network 318 regarding movement of objects, such as pallets, and/or robotic devices to warehouse management system 210. An example inventory task can be to move pallet A containing items of type B to location C.

Warehouse management system 210 can receive the inventory task instructions from logistics interface 310 and generate one or more task/mission instructions (e.g., an instruction to robotic device A to move pallet B from location C to location D) and/or plans for controlling robotic device(s) 120 to carry out the inventory task instructions. The task/mission instructions and/or plans can include information about one or more paths and/or one or more trajectories, where the task/mission instruction(s), plan(s), path(s) and trajectory/trajectories are generated by planning system 110 of warehouse management system 210 using the techniques discussed in the context of FIGS. 1 and 2.

For example, warehouse management system 210 can be a centralized control service running on and storing data using one or more computing devices; e.g., server computing devices. To perform these tasks, warehouse management system 210 can include WMS middleware and can provide a user interface to provide access to tools for monitoring and managing system 300. The WMS middleware and/or other components of warehouse management system 210 can use one or more application programming interfaces (APIs), such as protocol conversion APIs for conversion between task/mission instructions (e.g., an instruction to robotic device A to move pallet B from location C to location D) to robotic device paths, poses, and/or trajectories; conversion between inventory tasks and task/mission instructions; and conversions between APIs.

The user interface provided by warehouse management system 210 can provide one or more user interface functions for system 300, including, but not limited to: monitoring of robotic device(s) 120, e.g, presenting data related to location, battery status, state of charge, etc. of one or more robotic devices; enabling generation and sending of inventory task instruction(s), task/mission instruction(s), plan(s), path(s) and/or trajectory/trajectories to one or more of robotic device(s) 120; and reviewing, updating, deletion, and/or insertion of data related to one or more warehouse maps, pallets, networks, and/or planning systems (e.g., planning system 110, warehouse management system 210, and/or logistics interface 310).

In some embodiments, warehouse management system 210 can route communications between logistics interface 310 and robotic device(s) 120 and between two or more of robotic device(s) 120 and manage one or more onboard systems, such as onboard system 320 aboard one or more of robotic device(s) 120. In other embodiments, warehouse management system 210 can store, generate, read, write, update, and/or delete data related to system 300, such as, but not limited to: data regarding completion of a task/mission instruction by one or more of robotic device(s) 120; data regarding locations and/or poses of some or all of robotic device(s) 120, including data indicating a location where a robotic device was initialized/booted; data related to one or more audit trails for human actions, incident analysis, and/or debugging; and data for state tracking. In other embodiments, warehouse management system 210 can include a central message router/persistence manager that communicates with robotic device(s) 120 and one or more adapters. Each of the one or more adapters can provide access to data and/or communications of system 300 available to warehouse management system 210, and can include, but are not limited, to: a user interface service adapter for the above-mentioned user interface, a web content service adapter enabling World Wide Web (WWW)/Internet access to information about system 300, a message proxy adapter and/or a WMS adapter to act as intermediaries between communications between APIs and/or the WMS.

FIG. 3 shows that each of the one or more robotic devices 120 can include one or more of: onboard system 320, network switch 330, vehicle controller 332, programmable logic controller (PLC) 334, one or more device sensors 338, and one or more drives 340.

Onboard system 320 can be a computation and sensor package for robotic planning configured for installation into and use with robotic device 120, where onboard system 320 can include onboard sensors 322 and one or more planning/execution processors 324. FIG. 3 also shows that onboard system 320 that is configured to use network switch 330 at least to communicate with planning system 110 (via network 318), with device sensors 338, and/or with one or more actuators of robotic device 120.

Onboard system 320 can be responsible for one or more of: localization of robotic device 120, generation of local trajectories to carry out plans and/or travel along paths and/or trajectories provided by warehouse management system 210, generation of commands to drives 340 to follow one or more (local) trajectories, generation of commands to control actuator(s) of robotic device 120, and reporting pose, status and/or other information to warehouse management system 210.

Onboard sensors 322 can include one or more navigation lasers, laser scanners, cameras, and/or other sensors for navigating and/or controlling onboard system 320. For example, a robotic device of robotic device(s) 120 can include one or more laser scanners, such as one or more laser scanners provided by SICK AG of Waldkirch, Germany, HOKUYO AUTOMATIC CO. LTD of Osaka, Japan, and/or KEYENCE CORPORATION of Osaka, Japan. The laser scanners can be used for obstacle detection and/or avoidance along a direction of travel of the robotic device as well as along the sides, corners, and/or back of the robotic device. The laser scanners can also be used to localize the robotic device using reflector-based localization. In some embodiments, cameras and/or other sensors can be used for obstacle detection, obstacle avoidance, and/or localization instead of or along with the laser scanners.

Planning/execution processor(s) 324 can include one or more computer processors connected at least to onboard sensors 322. Planning/execution processor(s) 324 can read data from onboard sensors 322, generate local trajectories and/or commands to drive(s) 340 to move robotic device 120, and communicate with warehouse management system 210. A local trajectory can be a trajectory where robotic device 120 starts at a starting pose and reaches an ending pose at some time. In some examples, the starting pose can be implicitly specified; e.g., the starting pose can be a current pose of robotic device 120 and so the local trajectory be based on an assumption that its starting pose is the current pose of robotic device 120.

Planning/execution processor(s) 324 can utilize a component framework. The component framework can be a multi-threaded job scheduling and message passing system built on software libraries for input/output (I/O) and signaling configured to provide a consistent asynchronous model of robotic device 120, such as the "boost::asio" and "boost::signals2" software libraries provided by boost.org of Onancock, Va. The component framework can enable communication between software components (or modules) so that the software components can be executed in parallel in a thread safe manner.

The component framework can include one or more of: a state machine component, a localization component, a planning component, and a trajectory following component. The state machine component can manage a state of robotic device 120 for vehicle initialization, vehicle commanding and fault handling. The state machine component can use a deterministic finite automaton or other state machine to manage the state of the robotic device.

The localization component can read data from vehicle sensors and integrate prior state information of robotic device 120 to determine a pose of robotic device 120. The vehicle sensor data may be indicative of one or more landmarks/points of interest detected by the vehicle sensors. Alternatively, the data from the vehicle sensors may require processing such that the localization component detects the one or more landmarks/points of interest based on the vehicle sensor data. The pose can be determined relative to the one or more detected landmarks/points of interest, such as pallets or other objects. The planning component can receive one or more objectives from warehouse management system 210 and determine a local trajectory for robotic device 120 to achieve those objectives. In some embodiments, the local trajectory can be a short-term trajectory that robotic device 120 is to follow for a predetermined amount of time; e.g., 100 milliseconds, 200 milliseconds, 500 milliseconds, 1 second, 5 seconds. The trajectory following component can receive the local trajectory generated by the planning component, and generate drive control instructions to travel along the local trajectory. The drive control instructions that are then relayed to drives 340 that control a traction motor and other actuators for robotic device 120.

Network switch 330 can enable communications for robotic device(s) 120. These communications can include, but are not limited to, communications between onboard system 320 and the rest of robotic device 120; e.g., device sensors 338 and drives 340, and communications with warehouse management system 210 via network 318. For example, network switch 330 can enable Transmission Control Protocol/Internet Protocol (TCP/IP)-based communications over Ethernet and/or other wireline communications interface(s) to a wireline network and/or over Wi-Fi™ and/or other wireless communications interface(s) to a wireless network, such as a PLANET Ethernet Switch by PLANET Technology Corporation of New Taipei City, Taiwan.

In some embodiments, communications between robotic device(s) 120 and planning system 110 can include remote procedure calls (RPCs). The remote procedure calls can allow invocation of software procedures, methods, and/or functions resident on one or more of robotic device(s) 120 by software of planning system 110 and vice versa. The remote procedure calls can be based on a communications protocol, such as TCP/IP, a HyperText Transfer Protocol (HTTP) such as HTTP 1.0 and/or HTTP 2.0, and/or another communications protocol. Some or all of the remote procedure calls can include encrypted data; such data may be encrypted using the Secure Sockets Layer (SSL), Transport Layer Security (TLS), and/or one or more other encryption algorithms and/or protocols. In embodiments where encrypted data is used, one or more certification authorities, such as a private certification authority, can authenticate one or more certificates used in encrypting and/or decrypting the encrypted data. A certificate authority can use an access control list (ACL) to control access to the one or more certificates. The remote procedure calls can use a request/response protocol and/or a bidirectional streaming protocol for RPC-related communications. In embodiments where the bidirectional streaming protocol is used for RPC-related communications, a single long-lived RPC can be used to implement the bidirectional streaming protocol.

Vehicle controller 332 and/or programmable logic controller 334 can provide electrical and sensor management functionality for robotic device(s) 120. The electrical and sensor management functionality can include, but is not limited to, functionality for electrical load control, lighting control, sensor control, sensor and/or switch signal processing, and power management. Vehicle master 336 can provide functionality for controlling one or more actuators, such as lift devices, of robotic device(s) 320.

Device sensor(s) 338 can include one or more sensors that can provide data related to controlling and/or operating robotic device(s) 120. The data can provide information about an environment about robotic device(s) 120, such as but not limited to, localization information, position estimates, and mapping data. For example, device sensor(s) 338 can include one or more lasers (e.g., two-dimensional (2D) lasers, safety lasers, laser scanners), cameras (e.g., Time-of-Flight (ToF) cameras, Red-Green-Blue (RGB) cameras, thermal cameras), electrical sensors, proximity sensors, navigational devices, and location sensors.

Drive(s) 340 can include one or more drive controllers and/or actuators that provide functionality for moving robotic device(s) 120. The drive controllers can direct the drive actuators to control movement of robotic device(s) 120. The drive actuators can include one or more traction motors, electric drives, hydraulic drives, and pneumatic drives.

Figure 4:
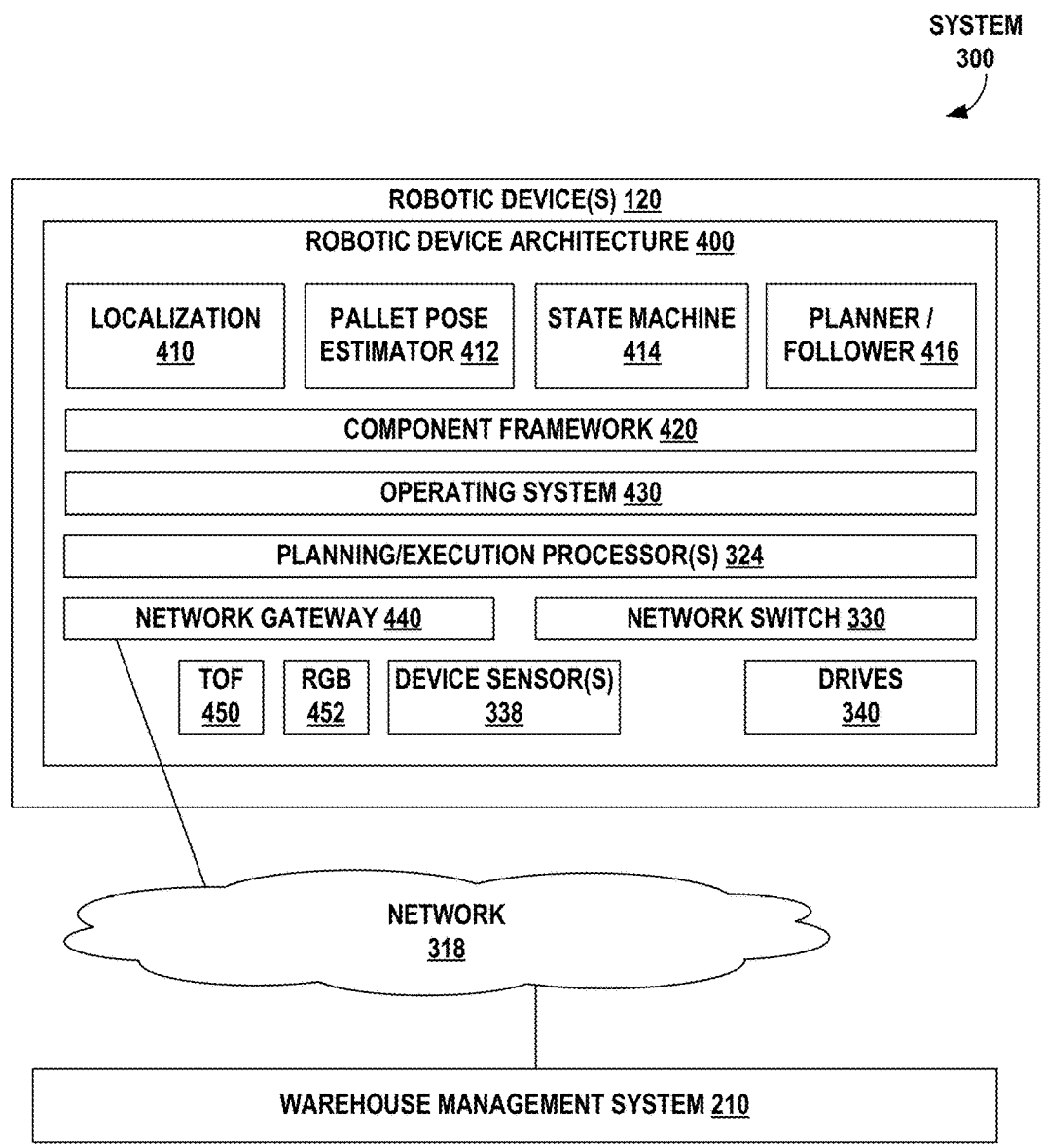
FIG. 4 illustrates robotic device architecture for one or more robotic devices, in accordance with an example embodiment.

FIG. 4 illustrates robotic device architecture 400 of robotic device(s) 120, in accordance with an example embodiment. Robotic device architecture 400 of robotic device(s) 120 can include software. The software can include software for localization 410, software for a pallet pose estimator 412, software related to state machine 414, software for planner follower 416, software for component framework 420 and software for operating system 430. The software can be executed by one or more hardware planning/execution processors 324. Communications between robotic device(s) 120 and other devices can be carried out using network gateway 440 and/or network switch 330. For example, network gateway 440 can be used for wireless communications with and within a robotic device of robotic device(s) 120 and network switch 330 can be used for wireline communications with and within a robotic device of robotic device(s) 120. Robotic device architecture 400 also includes additional hardware such as device sensor(s) 338 and drive(s) 340 discussed above in the context of FIG. 3. In some embodiments, robotic device architecture 400 can include one or more cameras, including but not limited to, ToF camera 450 and RGB camera 452, where the one or more cameras can include one or more still cameras and/or one or more video cameras.

Figure 5:
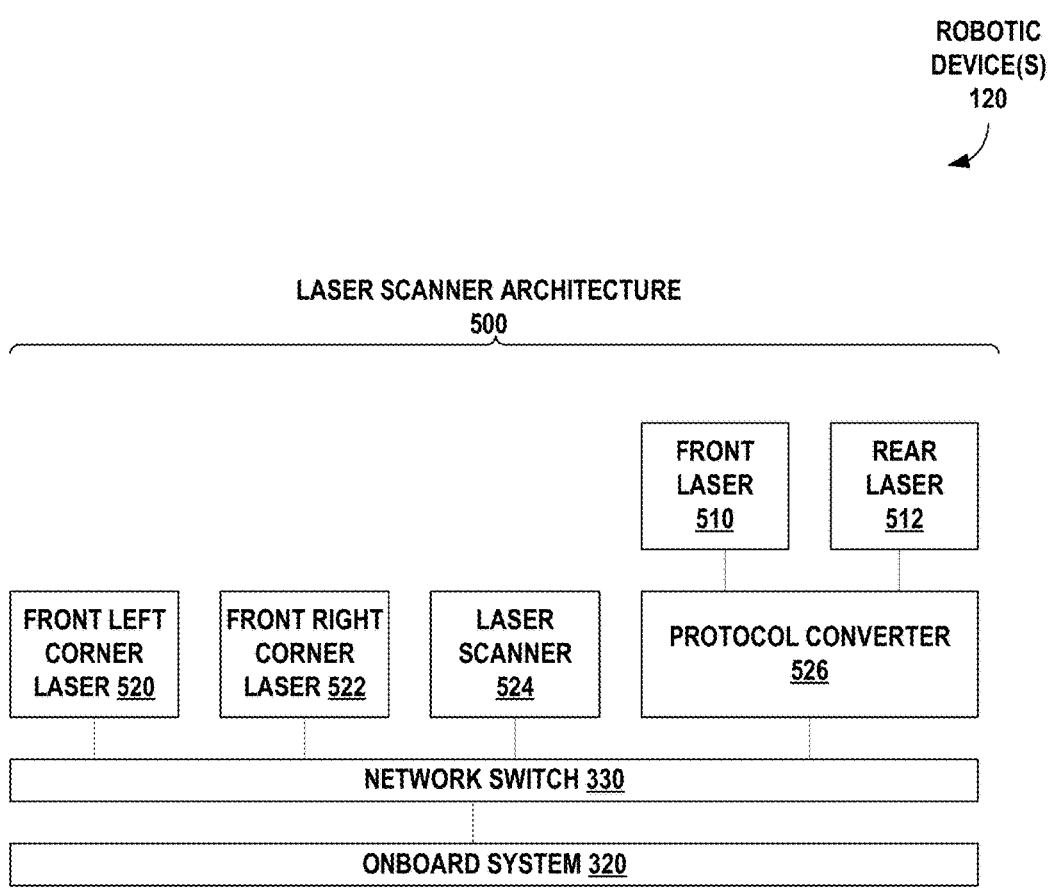
FIG. 5 illustrates laser scanner architecture for one or more robotic devices, in accordance with an example embodiment.

FIG. 5 illustrates laser scanner architecture 500 for robotic device(s) 120, in accordance with an example embodiment. In some embodiments, some or all of device sensor(s) 338 can be lasers and laser scanners illustrated by laser scanner architecture 500.

Laser scanner architecture 500 can include lasers 510, 512, 520, 522, laser scanner 524, protocol converter 526, network switch 330, and onboard system 320. Lasers 510, 512, 520, and 522 can be located at fixed positions of robotic device(s) 120; for example, laser 510 can be located at the front of a robotic device, laser 512 can be located at the rear of the robotic device, laser 520 can be located at a front left corner of the robotic device, and laser 522 can be located at a front right corner of the robotic device. Lasers 510, 512, 520, 522, and/or laser scanner 524 can provide information to localize the robotic device within an environment. In some embodiments, lasers 510, 512, 520, 522, and/or laser scanner 524 can emit light that is reflected off of one or more reflectors—the reflected light can be detected by one or more laser sensors, and the robotic device can be localized within the environment based on a duration of time taken to detect the reflected light. In particular of these embodiments, some or all of lasers 510, 512, 520, 522, and/or laser scanner 524 can include one or more laser sensors for detecting reflected laser light. Then, some or all of lasers 510, 512, 520, 522, and/or laser scanner 524 can generate data, including but not limited to, data related to a laser (e.g., maintenance data for the laser), data related to light emitted by the laser, and data related to one or more durations of time taken to detect reflected laser light by the laser sensor(s).

As illustrated in FIG. 5, some lasers, such as lasers 520, 522, and laser scanner 524 can be directly connected to network switch 330, while other lasers, such as lasers 510, 512, can be connected to network switch 330 via protocol converter 526. Protocol converter 526 can convert a communications protocol used by a laser, such as laser 510 and/or 512, to a communications protocol used by network switch 330; e.g., convert from a communications protocol based on RS-422 to a communications protocol based on Ethernet. Then, lasers 510, 512, 520, 522, and laser scanner 524 can send data to and receive commands from onboard system 320 via network switch 330 and perhaps protocol converter 526.

In some embodiments, robotic device(s) 120 can be subject to one or more failure conditions. Examples of those failure conditions and related recovery strategies are described in Table 1 below.

TABLE 1

| Name | Summary | Recovery Strategy |
| --- | --- | --- |
| Stale Localization | Localization system is unable to determine robotic device pose and/or localization certainty estimate has exceeded bounds. | Robotic device will halt and notify human operator. The operator can intervene by manually driving robotic device to a location for re-localization and reengaging. |
| Trajectory Following | Trajectory following error exceeds threshold. | Robotic device will halt and attempt to restart trajectory following automatically. If system fails twice in a row then human operator will be notified. The operator can intervene by manually driving robotic device back onto roadmap. |
| No Safe Trajectory | Due to obstacle proximity, the trajectory planner cannot find a safe trajectory that would keep the robotic device a safe distance from known obstacles. | Robotic device will halt and notify human operator. The operator can intervene by manually driving robotic device around obstacle. |
| Hardware Fault | Steering/traction drive fault or other low-level hardware I/O fault condition | Robotic device will halt and notify human operator. The operator can power-cycle and manually drive robotic device back onto roadmap. |
| Pallet Detection Failure | Robotic device expected to discover a pallet at commanded location; no pallet was found | Robotic device will send message to a control service that includes sensor data relative to where the pallet was expected to be discovered. The control service will notify human operator and optionally may send pallet pose information manually. |
| Pallet Pose Estimation Failure | Robotic device could not determine pose of pallet relative to robotic device at high confidence. | Robotic device will send message to a control service that includes sensor data relative to where the pallet was expected. The control service will notify human operator and send pallet pose information manually. |

III. Example Pre-mapping an Environment

Figure 6:
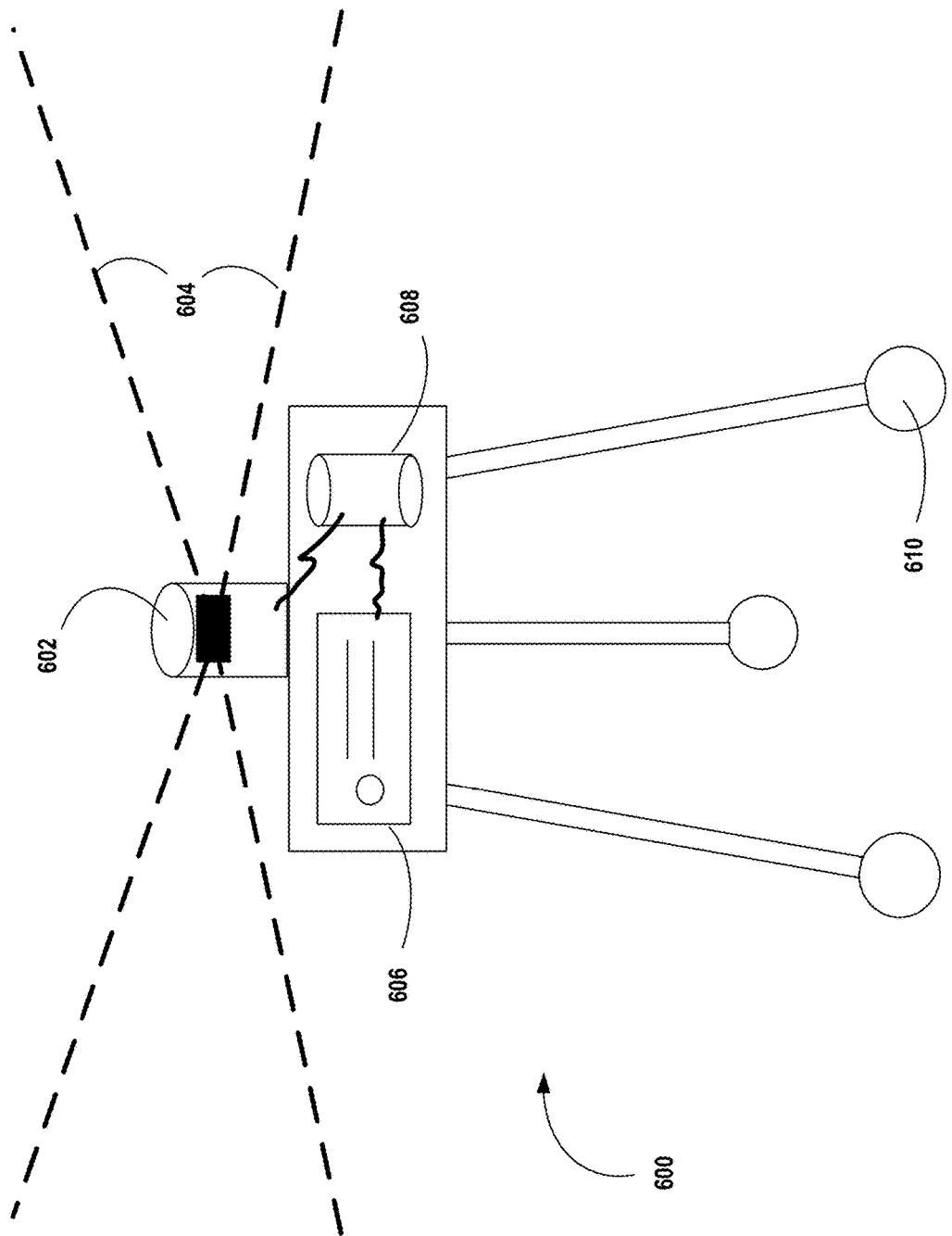
FIG. 6 shows a device for pre-mapping a space, according to an example embodiment.

FIG. 6 shows an example device for pre-mapping a space, according to an example embodiment. More specifically, the device includes a sensor 602 configured to collect sensor data representative of an environment in which one or more robots may later be deployed. In some examples, the sensor 602 may be a two-dimensional navigation laser sensor capable of producing distance measurements to surfaces in the environment, as well as locations of detected markers. In particular, the sensor 602 may project laser light beams 604 and measure reflected beams to measure distance. The sensor 602 may be mounted at a same height as a sensor on a robot to be deployed within a space in order to replicate detection capability of the robot. For instance, the sensor 602 may be positioned at a height to detect retroreflective reflectors arranged in a horizontal plane within an environment. In other examples, the sensor 602 may be a two-dimensional laser scanner that only produces distance or contour measurements. In further examples, the sensor 602 may be another type of sensor, such as a stereo camera.

The device additionally includes a computing unit 606 that processes the sensor data from sensor 602. In particular, computing unit 606 may be configured to run any of the types of mapping functionality described herein to generate maps of the space and/or use generated maps. The device additionally includes a battery pack 608 for powering both the sensor 602 and the computing unit 606. The device further includes a mobile base 610 that allows the device to be easily moved through a space in advance of deploying one or more robots. For instance, the mobile base 610 may be a tripod on wheels as shown in FIG. 6. Other types of mobile bases may be used, including power and/or unpowered mobile bases.

Within examples, the application of automated guided vehicles (AGVs) and optimization of warehouses (with or without AGVs) may require accurate geometric information about the environment (e.g., accurate maps). Accurate facility maps may lead to identification of facility/workflow inefficiencies in both manual and automatic vehicle environments (e.g., racks too close together to allow two power industrial trucks to pass). Facility layouts (e.g., CAD models) are used to guide the building design and construction process, and may not always updated to reflect the real world. Therefore, they often contain inaccuracies and may not be considered trustworthy (e.g., a CAD may contain correct and accurate walls while racks and other infrastructure added later may be off by considerable amounts, e.g., 30 centimeters). In some examples, a pre-mapping device such as shown in FIG. 6 may be used to help generate accurate facility maps that enable optimized AGV and/or manual fork truck deployments.

A pre-mapping system may be used for a number of different applications. In some examples, a map of a warehouse (e.g., a geometric map containing walls and other infrastructure such as racks) may be generated and compared to an existing CAD model of the space. This process may reveal that the CAD model does not properly reflect the real world. Facility maps may then be updated to the correct layouts. In further examples, warehouse mapping may be used to deploy a robotic system in simulation to demonstrate how the warehouse can be automated using robotic AGVs and/or optimized using manually-driven powered industrial trucks.

In additional examples, a warehouse space may be pre-mapped to assist in planning a marker (reflector) setup (e.g., locations to place reflectors in the environment) based on the map. Such a process may be used to speed up the planning phase of an AGV deployment.

In further examples, a warehouse map and reflector setup may be determined early in the AGV rollout process before sending any vehicles to the location (or while the vehicles are shipped to save time). Once vehicles arrive, they may upload the map(s) and start driving or use the map(s) to initialize and bootstrap subsequent mapping runs with vehicles.

In some examples, accurate mapping can also be used to determine if a new generation of manual trucks will be able to operate in an existing facility or if the facility will require modification. In additional examples, accurate maps may also allow for identification of manual facility inefficiencies like placement of racking, charging stations, or parking stations relative to workflows and travel distances. This information may be used to provide suggestions for more optimal facility layouts.

As mentioned, the computing unit 606 may be configured to run various mapping functionality based on sensor data collected by sensor 602. In some examples, the mapping functionality may include a hierarchical pose graph SLAM and bundle adjustment to build both a warehouse map and a reflector map. The functionality may produce both maps by switching between contours/distance measurements and marker detections in order to map a warehouse with only a partial reflector setup or no reflector setup at all. The mapping functionality may additionally include automatically aligning generated maps with the CAD model of the warehouse. The mapping functionality may additionally include bootstrapping the mapping process with a previously built map (e.g., a new map may be automatically aligned with both a CAD model and a previous map, with reflector positions bootstrapped from the previous map).

An example process may include retrieving results of a mapping run using the device illustrated in FIG. 6, including storage, visualization, etc. The retrieved results may then be applied for various functions, including uploading to vehicles for navigation, uploading to vehicles for new mapping runs (bootstrapped with results from the prior run), importing the results into a component that shows deployment of a system in simulation, importing the results into a component that compares a generated map with an existing CAD model, and/or importing the results into a component that assists with automated reflector planning.

IV. Example Localization of a Robot in an Environment

Figure 7:
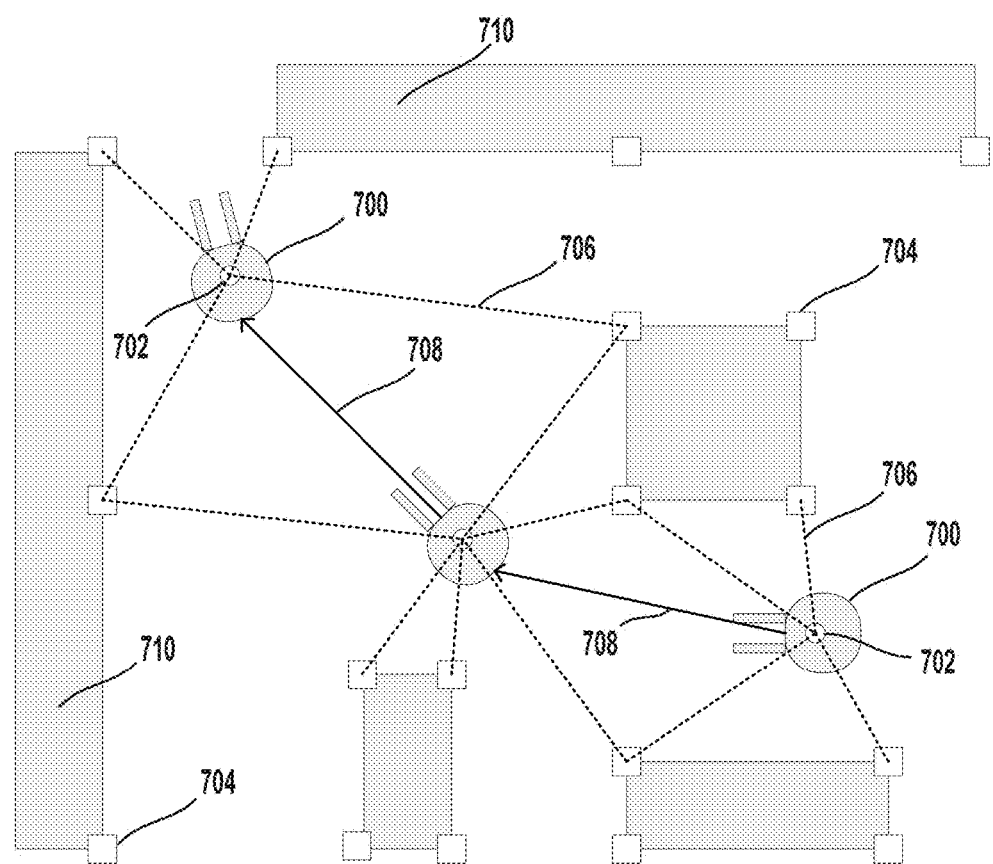
FIG. 7 shows a robot navigating within an environment, according to an example embodiment.

FIG. 7 shows a robot navigating within an environment, according to an example embodiment. A location and orientation of robot 700 relative to the environment may be estimated, enabling the robot to navigate through the environment accordingly. Particularly, the pose may indicate the location and orientation of the robot within the environment.

A computing system may determine the pose of robot 700 based on received signals 706 from one or more sensors 702. Signals 706 provided by sensor 702 may be reflected by retroreflective markers placed in various locations in a warehouse. For instance, the robot may use a light ranging and detection (LIDAR) unit that emits light to an area surrounding the robot, and markers positioned in the area surrounding the robot may reflect the light back for detection by a sensor of the robot.

Reflected signals 706 received at sensor 702 may indicate locations of the markers relative to the robot. A computing system may use these determined locations of the markers to develop a map of the markers. In some cases, the computing system may use detected markers to supplement an already generated map of the marker positions. For instance, the computing system may modify the position of one or more markers in the map using new measurements.

A computing system may also determine the pose of the robot as the robot navigates using the map of markers. The computing system may match detected markers with markers in the map to determine the robot's position and orientation. The locations of the markers in relation to obstacles 710 within the environment may be predetermined. For example, the locations of obstacles may also be mapped. The robot may make movements 708 to navigate within the environment while avoiding the obstacles based on the estimated pose and the predetermined locations of the obstacles.

Figure 8:
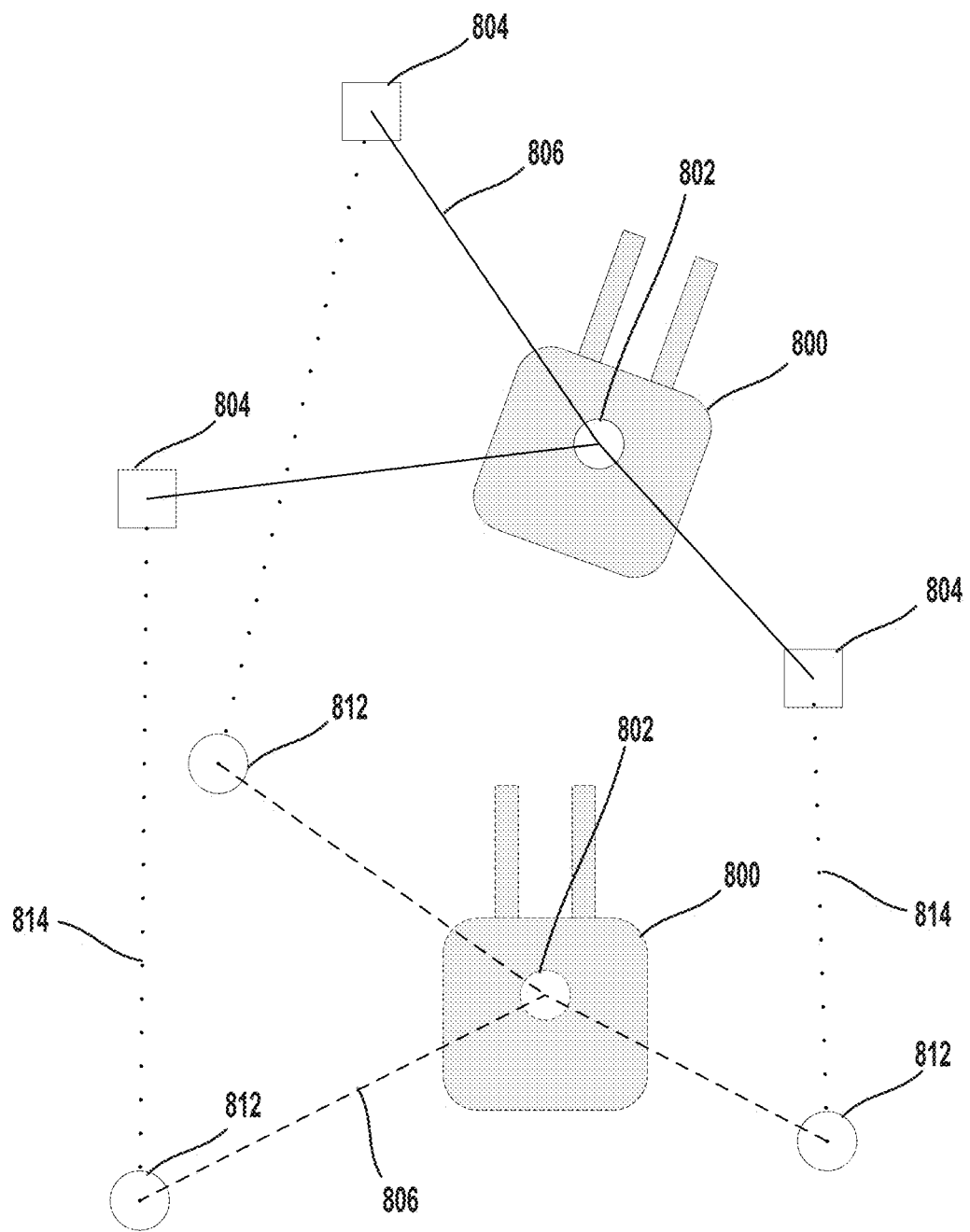
FIG. 8 shows a robot associating detections with mapped landmarks, according to an example embodiment.

FIG. 8 shows a robot associating detections with mapped landmarks, according to an example embodiment. Detected signals 806 from candidate landmarks 812 may be received by one or more sensors 802 of a robot 800. The signals may be indicative of locations of the candidate landmarks in relation to the robot. The candidate landmarks may be transformed to align with mapped landmarks 804. Associations 814 may be formed between the candidate landmarks and the mapped landmarks that result in a minimal distance between the transformed candidate landmarks and the mapped landmarks. For example, the associations 814 may be formed using a least means squared method such as an iterative closest point (ICP) method. The candidate landmarks may be translated and rotated based on the associations 814 between the candidate landmarks and the mapped landmarks. The pose of the robot may be inferred by similarly translating and rotating the robot.

Figure 9:
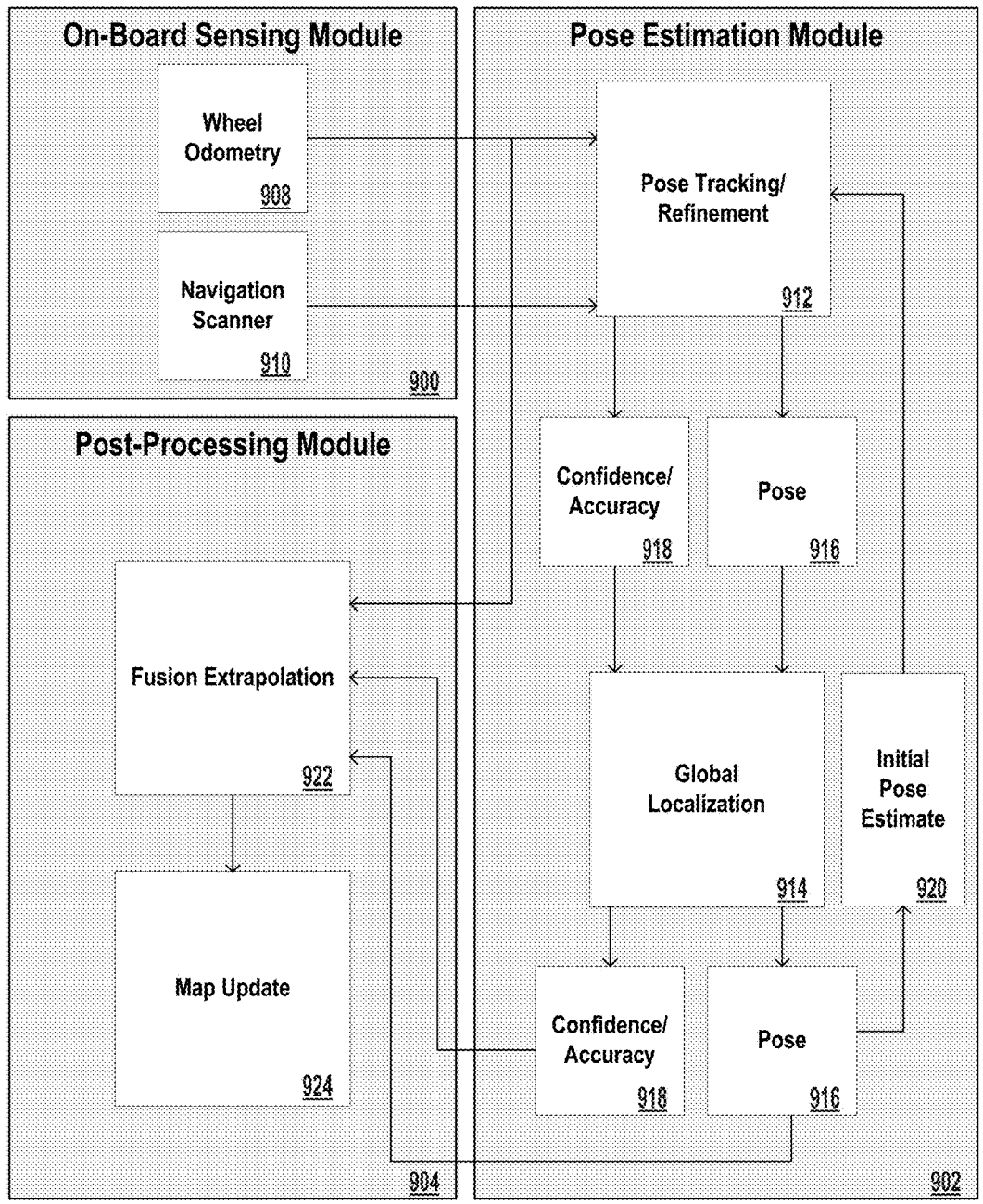
FIG. 9 is a functional block diagram illustrating modules of a robot control system, according to an example embodiment.

FIG. 9 is a functional block diagram illustrating modules of a robot control system, according to an example embodiment. The robot control system may include one or more sensors as part of an on-board sensing module 900. The sensors may provide data that is indicative of wheel odometry 908 of the robot. The sensors may also include a navigation scanner 910. The navigation scanner 910 may be configured to receive signals from candidate landmarks in an environment of the robot.

A pose estimation module 902 of the robot control system may indicate the location and orientation of the robot with respect to mapped landmarks in the environment. The pose estimation module 902 may include software that performs functions based on inputs from the on-board sensing module 900. For example, each time the navigation scanner 910 performs a scan, sensor data from the on-board sensing module may be processed by the pose estimation module 902 to determine a current location and orientation of the robot in the environment. The pose tracking/refinement block 912 and global localization block 914 of the pose estimation module 902 represent processing steps, while the pose block 916, confidence/accuracy block 918, and initial pose estimate block 920 represent outputs of the processing blocks 912 and 914.

The pose estimation module 902 may operate in two modes. In a first mode, the pose estimation module 902 may have an initial pose estimate 920 of the robot, and the pose tracking/estimate block 912 may update the initial pose estimate 920. The pose tracking/refinement 912 may utilize the wheel odometry 908 and data from the navigation scanner 910 in conjunction with the initial pose estimate 920 to identify the location of the robot in relation to candidate landmarks. The pose tracking/refinement block 912 may associate the candidate landmarks to particular mapped landmarks that are near to the initial pose estimate 920. The pose estimation module 902 may further provide a pose estimate 916 based on the association, and a confidence/accuracy 918 of the pose estimate. The confidence/accuracy 918 may indicate that the initial pose estimate is adequate, or that it requires further refinement. Also in the first mode, the pose 916 and confidence/accuracy 918 determined by the pose tracking/refinement block 912 may be used in the post-processing module 904 to determine a refined pose estimate of the robot. Meanwhile, the global localization block 914 may be skipped. Further, the pose estimate 916 derived during pose tracking/refinement 912 may be treated as the initial pose estimate 920 of the robot for use in subsequent pose estimations.

In a second mode, the pose estimation module 902 may have no initial indication of where the robot is within the environment. In other words, the initial pose estimate 920 may not yet be determined. In the second mode, the pose estimation module 902 may utilize global localization 914 rather than pose tracking/refinement 912 to determine the pose of the robot. The global localization block 914 may test associations between the candidate landmarks and mapped landmarks across the entire environment of the robot. The global localization block 914 may also output a pose estimate 916 and confidence/accuracy 918. Also in the second mode, the pose 916 and confidence/accuracy 918 determined by the global localization block 914 may be used in the post-processing module 904 to determine a refined pose estimate of the robot. Further, the pose estimate 916 derived during global localization 914 may be treated as the initial pose estimate 920 of the robot for use in subsequent pose estimations.

A post-processing module 904 may be used to refine the pose estimation derived from the pose tracking/refinement or global localization. The post-processing module may perform fusion extrapolation 922 of the pose estimate and confidence/accuracy of the localization module, and wheel odometry of the on-board sensing module. During fusion extrapolation, the refined pose estimate may rely more on the estimated pose provided by the localization module when there is a high confidence/accuracy. Conversely, the refined pose estimate may rely more on the wheel odometry when there is a low confidence/accuracy. Further, the post-processing module may provide a map update 924 based on the provided confidence/accuracy and refined pose estimate. For example, the map update may update locations of the mapped landmarks based on the refined pose estimate. In other examples, the map update may update statistical information associated with the mapped landmarks used to generate the refined pose estimation.

Each of the functions performed by the robot control system of FIG. 9 may be performed periodically. For example, navigation scanner 910 may perform scans at 8 Hz, while the wheel odometry 908 may update at 100 Hz. As another example, the processing blocks 912 and 914 of the pose estimation module may receive data from the on-board sensing module at 8 Hz, and may produce poses 916 and confidence/accuracies 918 at 8 Hz. Different frequencies are possible as well.

V. Example Slam Implementations

A computing system may perform SLAM or similar processes to determine a location of a robot while also detecting positions of markers within the environment. For example, the computing system may detect markers based on the intensity of measurements within laser scans and may match observed markers from different sets of measurements.

Potential errors can arise when attempting to associate detected markers across different scans, such as failures that result from a lack of enough detected markers or wrong associations between detected markers. A computing system may overcome these and other potential errors using a nearest neighbor approach that may associate each detected marker to the closest marker that has been detected multiple times. Particularly, the nearest neighbor approach may involve determining the nearest marker using a Euclidean distance or other distance determinations (e.g., Mahalanobis distance). In some instances, the computing system may also be configured to utilize a validation gate to determine when a marker has previously been observed or when the marker should be added as a newly detected landmark. The results of the data association between detected markers can enable the computing system to estimate a current pose of the robot within the environment.

The computing system may use control instructions from the robot's control system when estimating its current pose. For instance, odometry data provided from sensors positioned on wheels of the robot may be used to estimate changes in the current pose of the robot. As an example, a robot may have an initial 2D position $(x,y)$ with initial orientation $\theta$. After changing position by $(\Delta x, \Delta y)$ and changing orientation by $(\Delta\theta)$ as indicated by the controls applied by the control system, the updated pose of the robot is $(x+\Delta x, y+\Delta y)$ with updated orientation $(\theta+\Delta\theta)$. The computing system may further refine the estimated pose using the detected markers within incoming sensor scans.

The computing system may also estimate a current pose of a sensor (or the robot) using detected markers and other measurements of the environment (e.g., contour measurements representing distances to nearby surfaces). When the prior pose of the sensor/robot is known, the computing system may use the recent pose estimation to predict where markers should be located based on prior detection of markers. The computing system may continue to monitor changes in the robot's pose using subsequent measurements.

In some instances, the computing system may modify the uncertainty associated with each observed marker to reflect recent changes based on new measurements, and may also add newly detected markers to the map of markers in the environment. The computing system may perform SLAM iteratively to continuously update the map of markers in the space enabling the robot to map the environment while also navigating safely.

In another example implementation, a computing system may perform a modified SLAM process that uses one or more operations, such as initial pose monitoring, local window optimization, global optimization, and complete bundle adjustment. The computing system can often refrain from subsequent operations after the initial pose estimation. In effect, the computing system may determine whether or not to perform the next, computationally more expensive operation during performance of the preceding operation.

The computing system may add an initial scan of the environment to an underlying pose graph that represents a series of poses the robot. The initial scan may be assigned as pose (0) to form the basis of a map's coordinate frame. Thereafter, for every subsequent scan of the environment, the computing system may refer to the prior node added in the graph (e.g., pose (0)) and update the current pose accordingly. In some instances, the computing system may update the pose using a registration process (e.g., an Iterative Closest Point (ICP) algorithm)) for marker-based localization and the Euclidean point-to-point distance between pairs of matching marker detections and mapped landmarks as shown in the transform of equation [1].

$$T^* = \arg \min \Sigma_i \Sigma_j w_{ij} \|m_j - T(d_i)\|^2 \quad [1]$$

Equation [1] may be used to determine an error for a single link in a pose graph. In other words, a computing system may use equation [1] to determine if an error exists between two different poses. As such, a pose graph may include numerous links producing the optimization problem for reducing error. Equation [1] may assume constant weights of $w_{ij}=1$ for matches. In some instances, however, the computing system may be configured to apply non-constant weights to give a higher influence to markers detected closer to the robot or to detected markers that have been deemed stable by the computing system. The computing system may also factor detection rate of the markers and use a different error function, such as covariance-to-covariance metrics as in a generalized registration process (e.g., ICP). For every pair of matches between markers, the computing system may optimize the whole pose graph (or a partial graph) to solve individual ICP problems between two nodes simultaneously.

In some cases, matching of laser scans and marker detections within the scans may result in slight errors and inaccuracies. As such, local window optimization may overcome unwanted effects by refining the estimated pose via a pose graph optimization in a local window. Particularly, the computing system may optimize the estimated pose while keeping prior poses of neighboring nodes constant in the pose graph and limiting the use of older pose estimates that are outside the local window. For example, when scans only produce a few detected markers nearby the robot, the computing system may utilize local window optimization to improve the pose estimate.

The computing system may add a new node to a pose graph when the robot travels a distance or turns an angle between scans of the environment that exceed a maximum distance or a maximum turn angle. Particularly, the computing system may add the current scan to the underlying pose graph as the new reference scan that can be used for subsequent pose determinations.

The computing system may further determine a local neighborhood of other nodes in the pose graph and optimize the resulting sub-graph (i.e., the local neighborhood of nodes) to refine the estimate of the robot's current pose as well the other poses represented by the nodes in the local window. The computing system may keep nodes that connect the sub-graph to the rest of the pose graph constant and optimize all other poses within the sub-graph to refine the current pose while factoring new scans (i.e., information that has not been available when initial computing the respective poses).

The computing system may also perform loop detection and verification. For instance, if the local window contains graph nodes created during a previous pass through that area of the environment, the computing system may trigger a global optimization of the pose graph using the prior scans of the area. Global optimization may optimize all nodes in a pose graph representing changes in the robot's pose and enable building a map of marker positions. The computing system may add an edge with both poses to the graph when a marker is detected from two poses/nodes. By changing the two poses, the computing system may minimize the distances between the two points and obtain new robot poses. The computing system may go through all nodes and extract all marker detections in the world frame to obtain a map.

During global optimization, the computing system may match marker detections (or match contour scans of the environment) thereby form blocks within a large optimization problem that requires all poses in the graph to be optimized in order to minimize the differences between all found matches of markers detected within different scans of the environment. The computing system may match and optimize the pose graph in a repeated process until the global system converges to produce accurate pose estimations of the robot.

To account for noise and obtain a more accurate map of marker positions, the computing system may perform a final complete adjustment to optimize both the path of the robot and the map of marker positions. The computing system may optimize poses in the graph together with respective scans to build a new map of markers and may further correct measurement errors and other inaccuracies by refining the positions of mapped reflectors during bundle adjustment. Particularly, in some instances, aggregated marker detections may match very well in the pair-wise formulation of the global graph optimization, but may not accurately represent the actual positions of markers in the environment. Therefore, the computing system may use complete bundle adjustment to improve the accuracy of individual marker positions in the map of marker positions.

Figure 13:
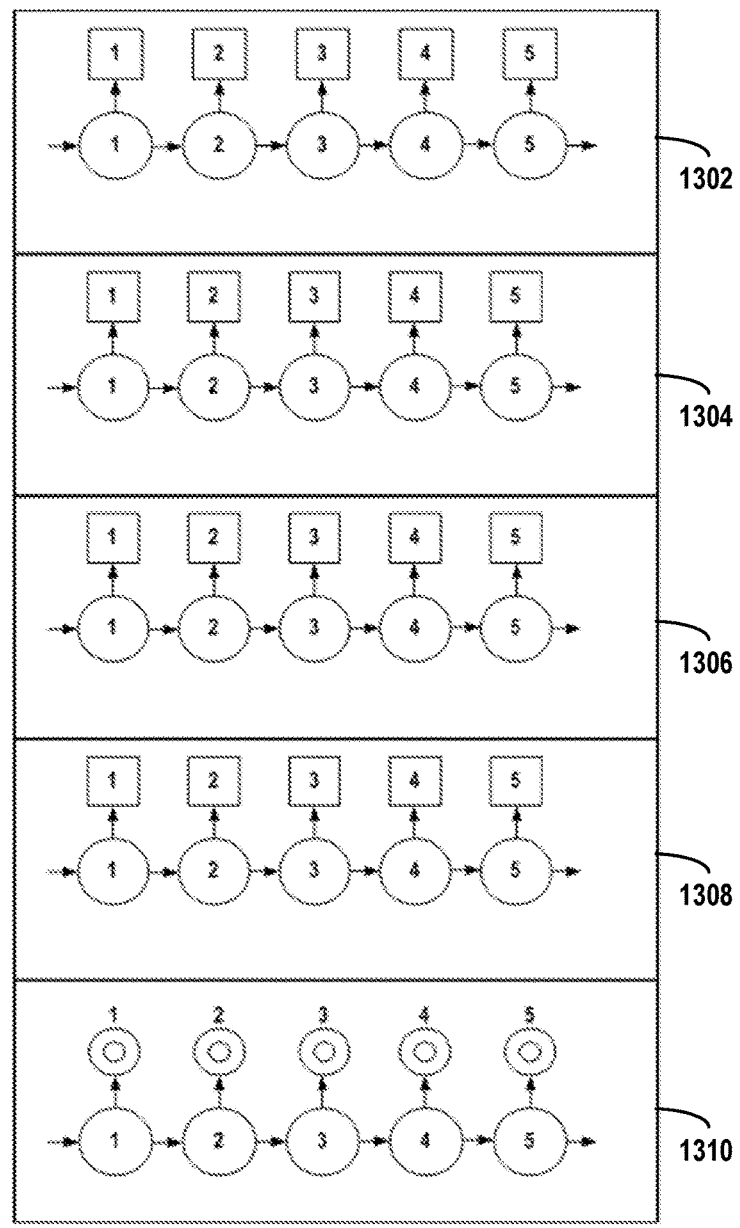
FIG. 13 illustrates pose graphs of a modified SLAM process, in accordance with example embodiments.

FIG. 13 illustrates pose graphs of a modified SLAM process. At step 1302, the modified SLAM process may involve pose monitoring. Pose monitoring may involve optimizing the current pose (circle 5) based on the last pose estimate (circle 4) and both scans (scans 4, 5). At step 1304, the modified SLAM process may involve pose monitoring refinement. Pose monitoring refinement may involve optimizing the current pose (circle 5) using a local window of poses (circles 2, 3, 4) and scans (squares 2, 3, 4, 5). At step 1306, the modified SLAM process may involve local window optimization. Local window optimization may involve all poses (circles 3, 4, 5) in the local window being optimized based on all scans (squares 2, 3, 4, 5) in the local window. The first pose (circle 5) remains constant and all other poses directly connected to poses outside the window remain not optimized to keep the integrity with the overall SLAM graph. At step 1308, the modified SLAM process may involve global optimization. Global optimization may involve all poses (circles 2, 3, 4, 5) being optimized using all scans (squares 1, 2, 3, 4, 5). Only the first pose (circle 1) is not optimized as the first pose (circle 1) defines the origin of the map coordinate frame. At step 1310, the modified SLAM process may involve complete bundle adjustment. All poses (circles 2, 3, 4, 5) and mapped markers (donuts 1, 2, 3, 4, 5) may be globally optimized. During complete bundle adjustment, only the first pose (circle 1) may not be optimized.

The computing system may continue to update the map of marker positions by aggregating marker detections of aligned scans. For each detected marker, the computing system may check to see if the detected marker matches a marker already added to the map, which may involve using a nearest neighbor search with a maximum distance corresponding to the expected inter-marker distance (e.g., 0.5 meter distance threshold) to identify matches between markers detected within multiple scans of the environment. If the computing system finds that a detected marker matches a marker positioned in the map, the computing system may adjust the position of the marker within the map if needed. In some instances, the computing system may speed up the matching process using an approximate nearest neighbor search in a kd-tree of the map of markers that can be rebuilt after adding new markers or rebuilding the map in general.

In some examples, a computing system may determine matches by going through all points in a set and matching each point with the closest point in another set of points. In particular, closest points within distance thresholds may be considered matches. In other examples, a computing system may use kd-trees or other search structures that may enable searching for matches faster.

In order to identify marker detections that are likely false detections, the computing system may monitor a local detection history to determine whether the marker is stable. Stable markers are included in the final map of marker positions as either new markers or to correct previously added markers. The computing system may distinguish an intermediate map representation that contains information about all markers detected within scans of the environment from a final map of the marker positions that only contains stable markers and no false detections likely caused by highly reflective surfaces.

In an example embodiment, the computing system may monitor a local detection history for each mapped marker to remove false detections. For instance, in a local window of n scans, the computing system may add a negative (for every mapped marker) for every scan added and a positive if the scan contained a marker detection matching the mapped marker. An example of the local window of detection is shown in FIG. 14.

Figure 14:
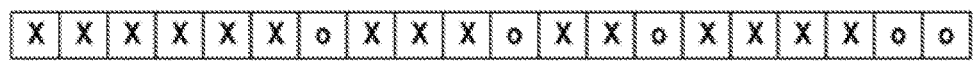
FIG. 14 illustrates a local window of detection process, in accordance with example embodiments.

FIG. 14 shows an example local window of detection process. In FIG. 14, local detection history 1400 includes squares and marks. Each square represents a scan of the environment. An "X" represents a detected marker and an "o" represents that no marker was detected. The window size shown in FIG. 14 corresponds to a window size 20 with 15 detections resulting in a 75% detection rate. As shown in FIG. 14, the computing system may use a window size of n=20 scans of the environment. Once the local window of a mapped marker shows a threshold amount of positives (e.g., 75% positives of the total scans), the computing system may consider the marker stable. As such, the computing system may continue to update stable marker, which cannot thereafter become unstable unless manually removed or if considered unstable during a complete rebuilt of the final map of markers. In the case the graph considerably changes from adding new scans (e.g., in the case of global optimization), the computing system may rebuild the map of markers, which may involve using a higher threshold for determining when a marker is stable (e.g., over 80% positives threshold of the total scans).

In some examples, the computing system may be configured to update the position of markers within the map of markers. For instance, to update the position of a mapped marker, the computing system may incrementally compute the mean $\mu$ over all n positions $p_i$ of matching marker detections as shown in equation [2].

$$\mu_n = \frac{1}{n}\sum_{i=1}^{n} p_i = \mu_{n-1} + \frac{1}{n}(p_n - \mu_{n-1}) \qquad [2]$$

As shown in equation [2], the computing system may weigh all marker detections equally, but may use incremental weighted mean in some examples to give markers detected closer to the sensor a higher weight than markers detected far away from the robot since the noise in the measured positions likely increase with distance. The computing system may also compute an incremental covariance for the aggregated position to provide an additional way of discriminating false from true marker detections since a false detection may likely show a larger variance. Further, the computing system may also switch from point-to-point errors to covariance-based error functions in pose monitoring and the cost functions of the graph optimizations.

VI. Example Systems and Methods

Figure 10:
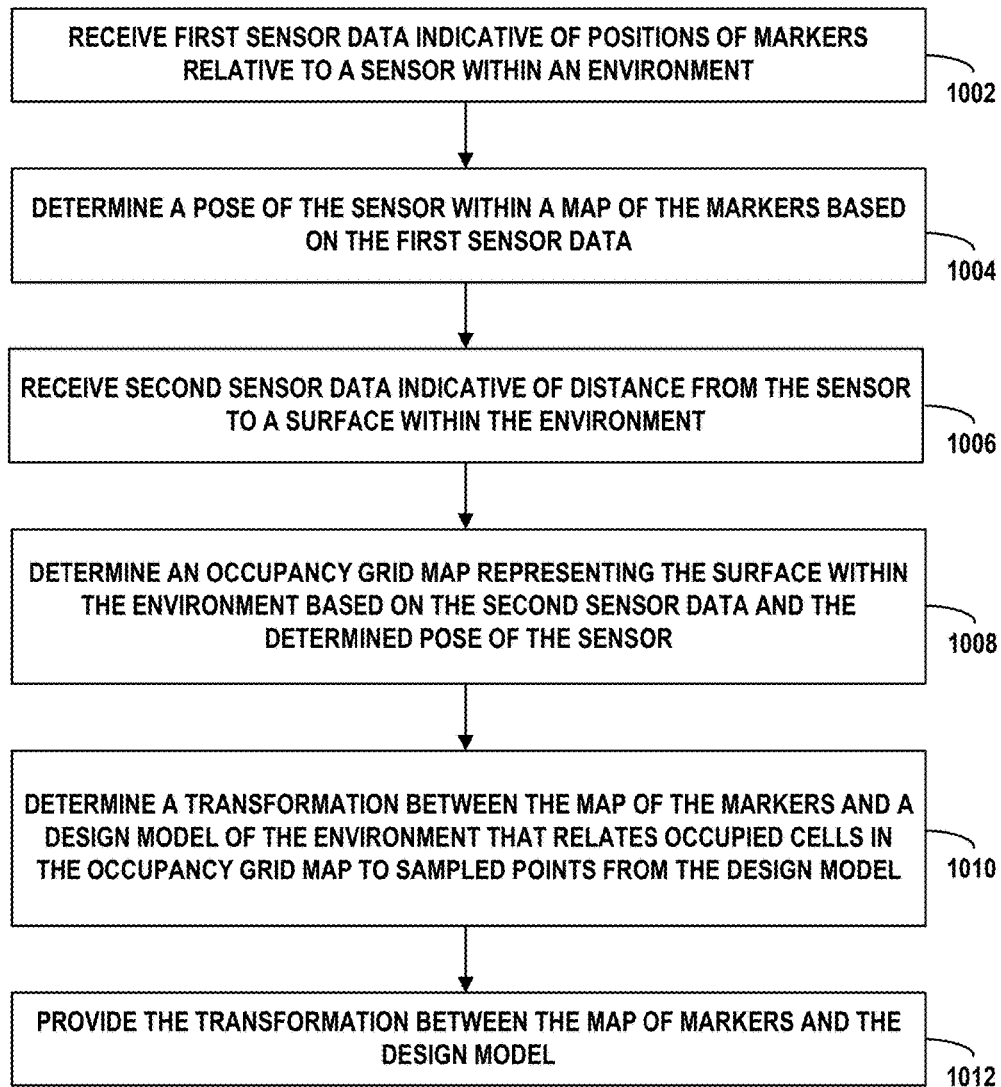
FIG. 10 is a flowchart that shows an example method for map generation and alignment.

FIG. 10 is a flowchart illustrating a method 1000, according to an example implementation. Particularly, method 1000 may be implemented to perform map generation and alignment.

Method 1000 (and other processes and methods disclosed herein) presents a method that can be implemented within an arrangement involving, for example, robotic device(s) 120 (or more particularly by components or subsystems thereof, such as by a processor and a non-transitory computer-readable medium having instructions that are executable to cause the device to perform functions described herein). Additionally or alternatively, method 1000 may be implemented within any other arrangements and systems.

Method 1000 and other processes and methods disclosed herein may include operations, functions, or actions as illustrated by one or more of blocks 1002, 1004, 1006, 1008, 1010, and 1012. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 1000 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM).

The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems and may be considered a computer readable storage medium, for example, or a tangible storage device. In addition, for the method 1000 and other processes and methods disclosed herein, each block in FIG. 10 may represent circuitry that is wired to perform the specific logical functions in the process.

At block 1002, method 1000 may include receiving first sensor data indicative of positions of a plurality of markers relative to the sensor within an environment. A computing system (e.g., control system, remotely positioned computing system) may receive sensor measurements of the environment from a sensor or sensors. For instance, the computing system may receive scans from a laser scanner as the laser scanner changes positions within the environment. The computing system may detect landmarks (e.g., markers) positioned in the environment within the incoming sensor data.

In an example implementation, the computing system may receive measurements of markers arranged along a horizontal plane from a 2D laser scanner. The computing system may detect markers in the horizontal plane in each scan from the laser scanner. In other examples, the computing system may receive sensor data from other types of sensors coupled to a mobile robot, such as camera images, RADAR, etc.

At block 1004, method 1000 may include determining a pose of the sensor within a map of the plurality of markers based on the first sensor data. Using the sensor data, the computing system may perform SLAM or a similar process to determine a pose of the sensor relative to the environment while also developing a map that specifies the positions of markers. The computing system may further determine and update the estimated pose as well as the map of markers as the sensor changes position within the environment.

In some examples, a computing system may determine a pose of a robot that includes the sensor. For instance, the computing system may assume that the pose of the sensor and the pose of the robot are equal. In further examples, a computing system may determine a pose of the robot using a fixed sensor to robot transform.

At block 1006, method 1000 may include receiving second sensor data indicative of distance from the sensor to a surface within the environment. The computing system may further receive sensor data that specifies distances between sensor(s) and surfaces in the environment. These contour measurements may specify the distance between the sensor and different physical features positioned nearby, such as walls, stairs, storage racks, etc. In some examples, the sensor(s) may be coupled to a robot or other type of vehicle and the computing system may define the distance between the sensor and a surface within the environment as the distance between the robot and the surface.

At block 1008, method 1000 may include determining an occupancy grid map representing the surface within the environment based on the second sensor data and the determined pose of the sensor. The computing system may use the estimated pose of the robot and the sensor data indicative of distances between the sensor and physical features in the environment to determine the occupancy grid.

The occupancy grid may include numerous cells from the robot's point of view (POV) that represents surrounding areas of the environment. Each cell may represent a particular area and may be assigned a state that indicates the status of the area. Particularly, a cell may be assigned as having an obstacle, free space, or unknown. Unknown cells may require additional sensor data to determine whether the area includes an obstacle or not. Since the occupancy grid is determined using sensor data from the robot's POV, the occupancy grid may be determined using the same coordinate frame as the map of marker positions determined using sensor data from a sensor of the robot. Accordingly, the computing system may align the map of marker positions with the occupancy grid.

Figure 11:
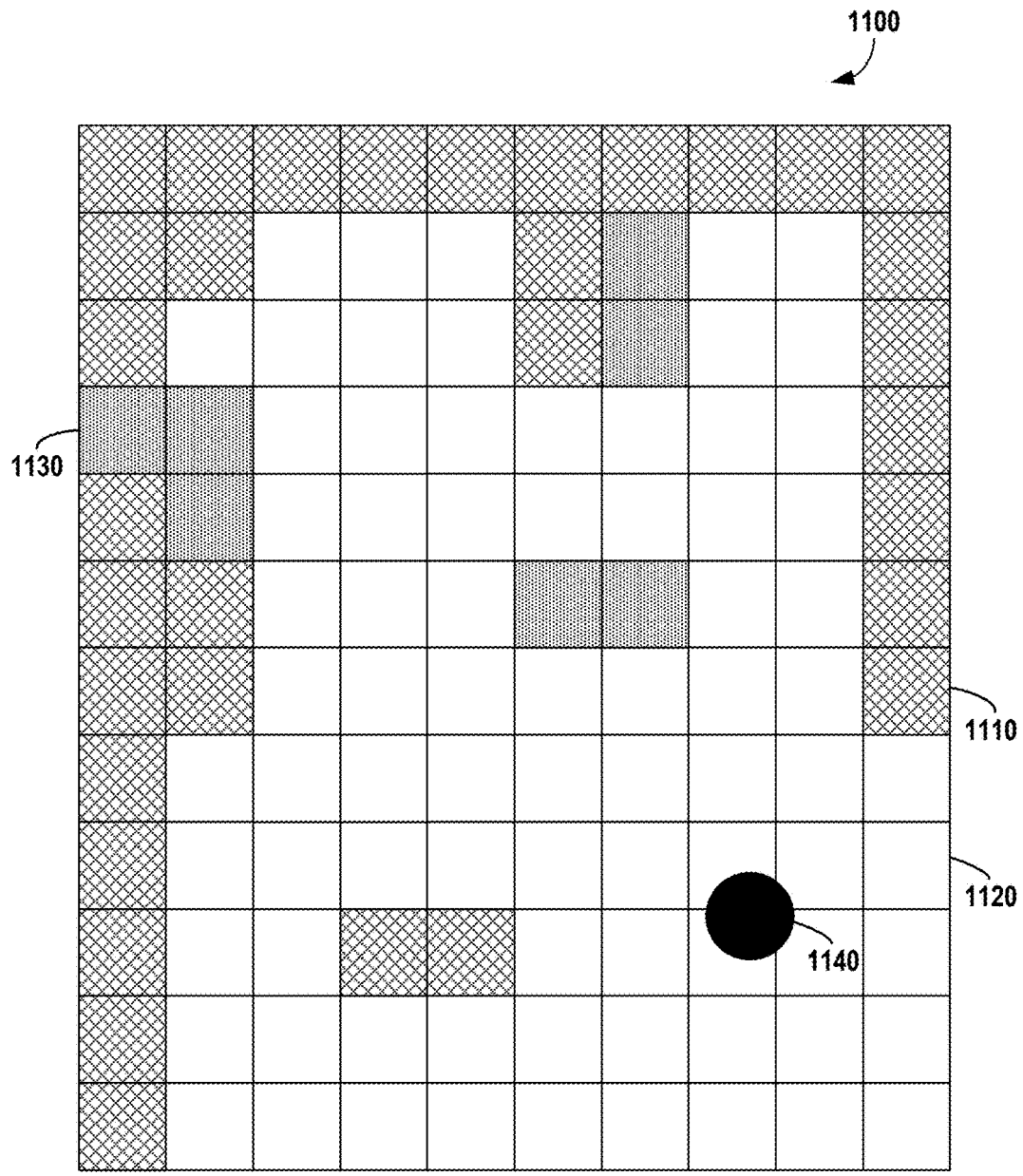
FIG. 11 illustrates an occupancy grid map, in accordance with example implementations.

FIG. 11 illustrates an example occupancy grid, in accordance with example embodiments. Occupancy grid 1100 represents surrounding areas of the environment from the POV of a sensor coupled to robot 1140. However, for illustration purposes, occupancy grid 1100 is shown from a top view perspective that further shows robot 1140 positioned within the environment. Each square cell of occupancy grid 1100 represents a corresponding area of the environment. In other examples, occupancy grid 1100 may include more or fewer cells, which may have different shapes and sizes. For example, the size and overall configuration of occupancy grid 1100 may differ depending on the environment that it represents.

Occupancy grid 1100 includes three different types of cells. The first type, cell 1110, includes crisscross patterns shading and represents areas that include a detected obstacle, such as physical features in the environment. Occupancy grid 1100 further includes numerous cells 1110 positioned around the border of occupancy grid 1100, which may correspond to walls or other physical obstacles that a robot may avoid during navigation.

The second type, cell 1120, includes no shading (empty cells) and represents free spaces in the environment. A robot may successfully navigate through cells 1120 in the environment without striking potential obstacles in the environment. The third type, cell 1130, includes dotted shading and represents unknown areas in the environment. A computing system developing occupancy grid 1000 may have not yet identified whether such areas contain an obstacle or are open space.

A computing system may continue to update and adjust occupancy grid 1100 utilizing new measurements of the environment from sensors coupled to one or more robots navigating the environment. As such, robot 1140 may develop occupancy grid 1100 to align the map of markers with a design model.

Referring back to FIG. 10, block 1010 may include determining a transformation between the map of the plurality of markers and a design model of the environment that relates occupied cells in the occupancy grid map to sampled points from the design model. A design model (e.g., CAD model) may specify the location and position of physical features of an environment, such as the positions of storage racks, charging stations, entrances and exits, parking spots, and a general layout of the walls and other structures. The computing system may determine a transformation between the map of markers and the CAD design model such that a control system navigating a robot in the environment may use both the marker positions and physical features to determine control strategy.

In an example embodiment, the computing system may sample a set of potential translations with a set of potential rotations and run a registration of the points using these initial estimates. For instance, the computing system may start with a large distance between point matches (e.g., 50 m) and render down to a resolution of the occupancy grid map during the registration. In each iteration step, the computing system may search for correspondences in the sampled model for all occupied cell centers (or a subset of these), and compute the transformation that minimizes the point to line error using equation [3]. In equation [3], "R" represents rotation, "t" represents translation, "p" is the point from the grid map, "q" is its match in the model, and "n" is the normal at the point (i.e., vector perpendicular to the direction of the line the point q has been sampled on).

$$t = \Sigma[(Rp_i + t - q_i) \times n_i]^2 \qquad [3]$$

In some instances, a CAD model representing aspects of an environment (e.g., warehouse) may contain polygons or sets of line segments that depict walls, racking, and other physical features in a space. When sampling points between a generated map of marker positions and the CAD model, a computing system may extract all line segments. When the length of a path segment in the map of markers exceeds a sampled distance, the computing system may add the start point and then sample along the line segment a set sample distance apart from one another. The computing system may also check for duplicates, which may involve determining that added sample points from several line segments do not correspond to a previously added point. For instance, when two line segments end or start in the same point, the computing system may add the point only once to the sampled point set.

In some examples, the computing system may determine a confidence based on how well points of the map of marker positions align with points of the design model. The confidence may be used to select a transformation that yields the highest confidence. For instance, the computing system may require the confidence to be above a threshold confidence level (e.g., 50% confidence). The computing system may also optimize the robot poses in the marker map and the transformation between the map of marker positions and the CAD model using matches between distance measurements and the CAD model.

In some examples, the computing system may determine a transformation via a rotation and a translation of a horizontal plane. For instance, the computing system may rotate the map of marker positions to align a coordinate frame of the map with a coordinate frame of the design model.

In a further example, the computing system may determine the transformation by sampling multiple two-dimensional rotation and translation values. In particular, the computing system may determine, for each candidate transformation of multiple candidate transformations, a sum of point-to-line normal distances between occupied cells in the occupancy grid map and lines from the design model that contain the sampled points. The computing system may further determine the transformation from the multiple candidate transformations based on the sum of point-to-line normal distances determined for each candidate transformation.

Additionally, the computing system may determine, for each candidate transformation of multiple candidate transformations, a measure confidence comprising a percentage of occupied cells in the occupancy grid map that are within a threshold distance of lines from the design model that contain the sampled points. The computing system may then determine the transformation based on the measured confidence determined for each candidate transformation. The computing system may also provide an indication of the measured confidence for the determined transformation.

FIG. 12A illustrates a transformation determination between a map of marker positions and a design model, in accordance with example embodiments. As shown in FIG. 12A, map of markers 1200 conveys positions of markers 1202 detected in scans from a sensor coupled to a robot navigating the environment. Markers 1202 are shown positioned at various locations to assist robots to navigate safely. In other examples, markers 1202 may include more or fewer markers in other examples.

Design model 1210 represents a 2D overview model of the same environment represented by map of markers 1200, and shows positions of physical structures, such as storage racks, walls, and other features. In the example illustration shown in FIG. 12A, a coordinate frame of map of markers 1200 is not aligned with a coordinate frame of design model 1210. A computing system, however, may determine a transformation that aligns the coordinate frame of map of markers 1200 with the coordinate frame of design model 1210. For instance, the computing system may use measurements of surfaces nearby the robot to determine an occupancy grid map and further determine a transformation that relates occupied cells in the occupancy grid map to sampled points from the design model.

As an example, the computing system may determine a sum of point-to-line normal distances between occupied cells in the occupancy grid map and lines from the design model that contain the sampled points and determine the transformation from a set of candidate transformations based on the sum of point-to-line normal distances determined for each candidate transformation. The computing system may also determine the transformation using other processes.

Figure 12B:
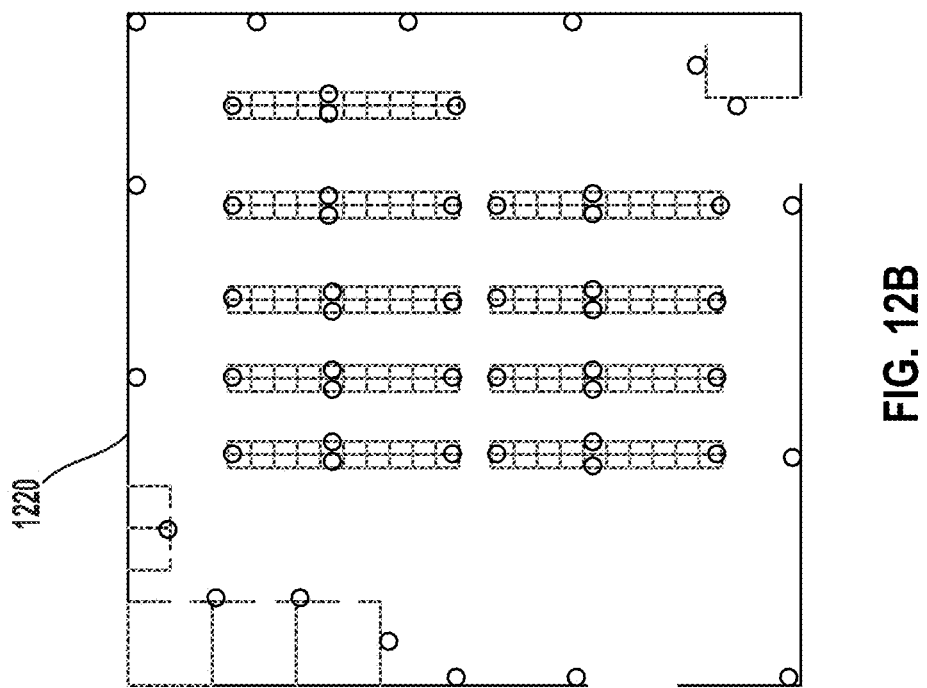
FIG. 12B illustrates an alignment between the map of marker positions and the design model depicted in FIG. 12A, in accordance with example embodiments.

FIG. 12B illustrates an alignment between the map of marker positions and the design model depicted in FIG. 12A, in accordance with example embodiments. As discussed above, a computing system may determine a transformation that aligns map of markers 1200 with design model 1210. As a result, the computing system may determine aligned map 1230 that depicts positions of markers 1202 relative to physical features in the environment. Accordingly, robots may use aligned map 1230 to determine paths and avoid obstacles during navigation.

Referring back to FIG. 10, block 1012 may include providing the transformation between the map of the plurality of markers and the design model. The computing system may provide the transformation to one or more devices, such as the control systems of robots deployed in the environment or other systems. As an example, the computing system may use the transformation, marker positions, and positions of physical features indicated in a design model to provide control instructions for navigating a robot in the environment. The computing system may supplement the control instructions with additional information, such as alerts for difficult areas to navigate.

In some example embodiments, a computing system may refine pose estimation for a robot relative to a developed map of marker positions using additional sensor data received. For instance, the computing system may adjust the position or orientation of the robot relative to a set of markers using newly acquired scans of the environment.

The computing system may also adjust the determined transformation based on the refined pose of the robot. For example, the computing system may adjust the transformation by sampling a range of candidate transformations based on the previously determined transformation. Particularly, the range of candidate transformations may be narrower than the initial range of candidate transformations that the computing system used to originally determine the initial transformation.

In some SLAM graphs, a graph may include pose and scans in the nodes and edges formed by matches of marker detections from two poses (nodes). When simultaneously doing alignment, the computing system may add additional edges representing matches of distance measurements (not marker detections) to the closest points sampled from the CAD model. Instead of using a point-to-error, the computing system may use a point to line error to optimize the poses in a way that minimize the distances between matching marker detections and between measured 2D scan point to walls and racking in the CAD model.

In some example embodiments, the computing system may determine the map of marker positions and the transformation by solving a graph-based optimization problem. The graph-based optimization problem may involve minimizing a separate edge for each point-to-line normal distance between an occupied cell in the occupancy grid map and a line from the design model that contains a sampled point. The computing system may solve the graph-based optimization problem to align points in the map of markers with points in the design model while simultaneously performing SLAM.

In some examples, a computing system may identify an alignment error in the CAD model based on a determined transformation and further provide an indication of the identified alignment error in the CAD model. For instance, the computing system may determine that the CAD model representation of a position and orientation of physical feature slightly differs from the actual position and orientation of the physical feature. As such, the computing system may identify the alignment error when determining the transformation (or after) and provide an indication of the alignment error.

In another example involving a large environment with dozens or hundreds of markers, a computing system may determine a transform between the map of marker positions and a design model by determining a centroid for both the map and the design model. The computing system may subtract the means from all markers in the map of the markers and use a registration based process (e.g., an ICP process) on the resulting point sets with different initial poses covering a range of potential orientations. Accordingly, the computing system may use the registration alignment that yields the highest number of inliers to determine alignment parameters (i.e., a transform that enables the alignment).

In a further example embodiment, a computing system may align a map of marker positions with a prior version of the map to confirm positions of markers within the environment. For example, the computing system may sample potential matches between markers positioned within both maps using a consensus-based framework and further use the matches that produces the largest number of inliers (matches found after using the alignment computed for the sampled set) to generate an updated map of marker positions that factors both maps.

V. Conclusion

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

What is claimed is:

1. A method comprising:
    receiving, from a sensor, first sensor data indicative of positions of a plurality of markers relative to the sensor within an environment;
    determining a pose of the sensor within a map of the plurality of markers based on the first sensor data;
    receiving, from the sensor, second sensor data indicative of distance from the sensor to a surface within the environment;
    determining an occupancy grid map representing the surface within the environment based on the second sensor data and the determined pose of the sensor;
    determining a transformation between the map of the plurality of markers and a design model of the environment that relates occupied cells in the occupancy grid map to sampled points from the design model; and
    causing a robot to navigate the environment based on the transformation between the map of the plurality of markers and the design model.

2. The method of claim 1, wherein the plurality of markers comprises a plurality of retroreflective markers arranged along a horizontal plane, and wherein the first sensor data is received from a two-dimensional laser scanner.

3. The method of claim 1, wherein determining the transformation comprises determining a rotation and a translation of a horizontal plane.

4. The method of claim 1, wherein determining the transformation comprises sampling a plurality of two-dimensional rotation and translation values.

5. The method of claim 1, wherein determining the transformation comprises:
    determining, for each candidate transformation of a plurality of candidate transformations, a sum of point-to-line normal distances between occupied cells in the occupancy grid map and lines from the design model that contain the sampled points; and determining the transformation from the plurality of candidate transformations based on the sum of point-to-line normal distances determined for each candidate transformation.

6. The method of claim 1, wherein determining the transformation comprises:

determining, for each candidate transformation of a plurality of candidate transformations, a measure confidence comprising a percentage of occupied cells in the occupancy grid map that are within a threshold distance of lines from the design model that contain the sampled points; and determining the transformation from the plurality of candidate transformations based on the measure confidence determined for each candidate transformation.

7. The method of claim 6, further comprising providing an indication of the measure confidence for the determined transformation.

8. The method of claim 1, wherein determining the occupancy grid map comprises assigning each cell a state that is one of an obstacle, free space, and an unknown region.

9. The method of claim 1, further comprising:

refining the pose of the sensor within the map of the plurality of markers based on additional received sensor data; and adjusting the transformation between the map of the plurality of markers and the design model of the environment based on the refined pose of the sensor within the map of the plurality of markers.

10. The method of claim 9, wherein adjusting the transformation comprises sampling a range of candidate transformations based on the determined transformation, wherein the sampled range of candidate transformations in narrower than an initial range of candidate transformations used to determine the transformation.

11. The method of claim 1, further comprising determining the map of the plurality of markers and the transformation by solving a graph-based optimization problem.

12. The method of claim 11, wherein the graph-based optimization problem comprises a separate edge for each point-to-line normal distance between an occupied cell in the occupancy grid map and a line from the design model that contains a sampled point.

13. The method of claim 1, wherein the design model of the environment comprises a computer-aided design (CAD) model.

14. The method of claim 13, further comprising:

identifying an alignment error in the CAD model based on the transformation; and providing an indication of the identified alignment error in the CAD model.

15. A system, comprising:

a sensor;

a computing system; and a non-transitory computer readable medium; and program instructions stored on the non-transitory computer readable medium and executable by the computing system to:

receive, from the sensor, first sensor data indicative of positions of a plurality of markers relative to the sensor within an environment;

determine a pose of the sensor within a map of the plurality of markers based on the first sensor data;

receive, from the sensor, second sensor data indicative of distance from the sensor to a surface within the environment;

determine an occupancy grid map representing the surface within the environment based on the second sensor data and the determined pose of the sensor;

determine a transformation between the map of the plurality of markers and a design model of the environment that relates occupied cells in the occupancy grid map to sampled points from the design model; and cause a robot to navigate the environment based on the transformation between the map of the plurality of markers and the design model.

16. The system of claim 15, wherein the plurality of markers comprises retroreflective markers.

17. The system of claim 15, wherein the computing system is further configured to:

refine the pose of the sensor within the map of the plurality of markers based on additional received sensor data; and adjust the transformation between the map of the plurality of markers and the design model of the environment based on the refined pose of the sensor within the map of the plurality of markers.

18. A non-transitory computer readable medium having stored therein program instructions executable by a computing system to cause the computing system to perform operations, the operations comprising:

receiving, from a sensor, first sensor data indicative of positions of a plurality of markers relative to the sensor within an environment;

determining a pose of the sensor within a map of the plurality of markers based on the first sensor data;

receiving, from the sensor, second sensor data indicative of distance from the sensor to a surface within the environment;

determining an occupancy grid map representing the surface within the environment based on the second sensor data and the determined pose of the sensor;

determining a transformation between the map of the plurality of markers and a design model of the environment that relates occupied cells in the occupancy grid map to sampled points from the design model; and causing a robot to navigate the environment based on the transformation between the map of the plurality of markers and the design model.

19. The non-transitory computer readable medium of claim 18, wherein the sensor is coupled to a vehicle; and wherein the operations further comprise:

determining a pose of the vehicle using a fixed sensor to vehicle transform.

* * * * *